(12) United States Patent
Cier et al.

(10) Patent No.: US 12,462,483 B2
(45) Date of Patent: Nov. 4, 2025

(54) AUTOMATED LOCALIZATION USING BEACON TRANSMITTER DEVICES OF DATA ACQUIRED IN BUILDINGS

(71) Applicant: MFTB Holdco, Inc., Seattle, WA (US)

(72) Inventors: Sean P. Cier, Ravensdale, WA (US); Sing Bing Kang, Redmond, WA (US); Chris North, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 259 days.

(21) Appl. No.: 18/093,780

(22) Filed: Jan. 5, 2023

(65) Prior Publication Data

US 2024/0233260 A1   Jul. 11, 2024

(51) Int. Cl.
| | |
|---|---|
| *G06T 17/05* | (2011.01) |
| *G06T 7/50* | (2017.01) |
| *G06T 7/70* | (2017.01) |

(52) U.S. Cl.
CPC ............... *G06T 17/05* (2013.01); *G06T 7/50* (2017.01); *G06T 7/70* (2017.01)

(58) Field of Classification Search
CPC ..................................................... G06T 17/05
See application file for complete search history.

(56) References Cited

U.S. PATENT DOCUMENTS

| | | |
|---|---|---|
| 5,140,352 A | 8/1992 | Moore et al. |
| 6,031,540 A | 2/2000 | Golin et al. |
| 6,141,034 A | 10/2000 | McCutchen |

(Continued)

FOREIGN PATENT DOCUMENTS

| | | |
|---|---|---|
| EP | 2413097 A2 | 2/2012 |
| EP | 2505961 A2 | 10/2012 |

(Continued)

OTHER PUBLICATIONS

Alletto et al., "An Indoor Location-Aware System For An IoT-Based Smart Museum", IEEE Internet Of Things Journal 3(2), Apr. 1, 2016, 11 pages.

(Continued)

*Primary Examiner* — Shivang I Patel
(74) *Attorney, Agent, or Firm* — VLP Law Group LLP; James A. D. White

(57) ABSTRACT

Techniques are described for using computing devices to perform automated operations for using wireless transmitter devices (e.g., beacon devices) at a building for determining the acquisition locations of images or other data acquired at the building, and for subsequently using the acquired data and determined acquisition location information in one or more further automated manners. Images to be analyzed may include panorama images acquired at acquisition locations in an interior of a multi-room building, and the determined acquisition location information may include a location on a building floor plan and optionally orientation direction—the acquisition location determination may further be performed without having or using information from any distance-measuring devices about distances from an image's acquisition location to objects in the surrounding building. The acquisition location information may be used in various automated manners, including for controlling navigation of devices (e.g., autonomous vehicles).

27 Claims, 19 Drawing Sheets

(56) References Cited

U.S. PATENT DOCUMENTS

| | | |
|---|---|---|
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | Mccutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 11,055,531 B1 | 7/2021 | Maestas |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,200,421 B1 | 12/2021 | Chavez et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0153773 A1* | 6/2014 | Gupta ............... G06T 7/75 382/103 |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2014/0327792 A1* | 11/2014 | Mulloni ............... H04N 23/69 348/211.8 |
| 2015/0109338 A1 | 4/2015 | McKinnon et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |

(56) References Cited

U.S. PATENT DOCUMENTS

| | | |
|---|---|---|
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0192253 A1 | 7/2018 | Khan et al. |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0321353 A1* | 11/2018 | Patel .................. G01C 21/1654 |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0065271 A1 | 3/2021 | Benkreira et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0076491 A1 | 3/2022 | Zellner et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |

FOREIGN PATENT DOCUMENTS

| | | |
|---|---|---|
| EP | 2506170 A2 | 10/2012 |
| EP | 3989178 A1 | 4/2022 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019058266 A1 | 3/2019 |
| WO | 2019083832 A1 | 5/2019 |
| WO | 2019104049 A1 | 5/2019 |
| WO | 2019118599 A2 | 6/2019 |
| WO | 2020068177 A1 | 4/2020 |
| WO | 2022053888 A1 | 3/2022 |

OTHER PUBLICATIONS

Jeff Butts, "Check Out Schlage's Upcoming Home Key Smart Lock", Dec. 20, 2021, retrieved from https://www.macobserver.com/news/product-news/check-out-schlages-upcoming-home-key-smart-lock/ on Nov. 7, 2022, 4 pages.

Estimote UWB Beacons, retrieved from https://estimote.com/uwb-beacons on Nov. 7, 2022, 15 pages.

Huang et al., "A Hybrid Method to Improve the BLE-Based Indoor Positioning in a Dense Bluetooth Environment", Sensors 2019 19(2), 424, 15 pages.

Geetha Kakarlapudi, "Analysis Of Beacon Triangulation In Random Graphs", Feb. 17, 2005, Texas A&M University, retrieved from https://oaktrust.library.tamu.edu/bitstream/handle/1969.1/1447/etd-tamu-2004C-CPSC-Kakarla.pdf?sequence=1&isAllowed=y on Nov. 7, 2022, 64 pages.

Kampmann et al., "Infrared Beacons For Robust Localization", arXiv:2104.09335v1, Apr. 19, 2021, retrieved from https://deepai.org/publication/infrared-beacons-for-robust-localization on Nov. 7, 2022, 9 pages.

Ultra-Wideband Indoor Positioning System, retrieved from https://marvelmind.com/download/uwb/ on Nov. 7, 2022, 8 pages.

Minea et al., "Developing a Solution for Mobility and Distribution Analysis Based on Bluetooth and Artificial Intelligence", Sensors 2020, 20, 7327, retrieved from https://doi.org/10.3390/s20247327 on Nov. 7, 2022, 27 pages.

Morgado et al., "Beacons Positioning Detection, A Novel Approach", 10th International Conference on Ambient Systems, Networks and Technologies (ANT), Apr. 29-May 2, 2019, 8 pages.

Shchekotov et al., "Semi-Automatic Self-Calibrating Indoor Localization Technique", 2018 23rd Conference of Open Innovations Association (FRUCT), Nov. 2018, 8 pages.

Shchekotov et al., "The Ontology Driven SLAM Based Indoor Localization Using BLE Beacon Multilateration", 2021 Journal Of Physics Conference Series 1801(1):012007, Feb. 2021, 13 pages.

Spachos et al., "BLE Beacons for Indoor Positioning at an Interactive IoT-Based Smart Museum", arXiv:2001.07686v1, Jan. 21, 2020, retrieved from http://arxiv.org/pdf/2001.07686v1 on Nov. 7, 2022, 11 pages.

UWB—The First Choice For RTLS And Smart Homes, retrieved from https://www.rfid-wiot-search.com/uwb-the-first-choice-for-rtls-and-smart-homes on Nov. 7, 2022, 13 pages.

Wikipedia—Bluetooth Low Energy Beacon, retrieved from https://en.wikipedia.org/wiki/Bluetooth_Low_Energy_beacon on Nov. 7, 2022, 8 pages.

Wikipedia—Indoor Positioning System, retrieved from https://en.wikipedia.org/wiki/indoor_positioning_system on Nov. 7, 2022, 15 pages.

Wikipedia—Types Of Beacons, retrieved from https://en.wikipedia.org/wiki/Types_of_beacons on Nov. 7, 2022, 4 pages.

Wikipedia—Ultra-wideband, retrieved from https://en.wikipedia.org/wiki/Ultra-wideband on Nov. 7, 2022, 10 pages.

Ye et al., "Application of Ibeacon in Indoor Positioning and Navigation", 2020 Journal Of Physics Conference Series 1575:012056, Jul. 2020, 8 pages.

Ishihara et al., "Deep Learning And Geometry-Based Image Localization Enhanced By Bluetooth Signals", 2018 Information Processing 26:707, Jan. 2018, 11 pages.

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

(56) References Cited

OTHER PUBLICATIONS immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform For Business, retrieved on Mar. 27, 2019, from https://www.istaging.com/en/, 7 pages.
Metareal, retrieved on Mar. 27, 2019, from https://www.metareal.com/, 4 pages.
PLNAR—The Ar 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.
GeoCV, retrieved on Mar. 28, 2019, from https://geocv.com/, 4 pages.
Biersdorfer, J.D., "How To Make A 3-D Model Of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Pintore et al., "AtlantaNet: Inferring the 3D Indoor Layout from a Single 360 Image beyond the Manhattan World Assumption", ECCV 2020, 16 pages.
Cowles, Jeremy, "Differentiable Rendering", Aug. 19, 2018, accessed Dec. 7, 2020 at https://towardsdatascience.com/differentiable-rendering-d00a4b0f14be, 3 pages.
Yang et al., "DuLa-Net: A Dual-Projection Network for Estimating Room Layouts from a Single RGB Panorama", in arXiv:1811.11977[cs.v2], submitted Apr. 2, 2019, 14 pages.
Sun et al., "HoHoNet: 360 Indoor Holistic Understanding with Latent Horizontal Features", in arXiv:2011.11498[cs.v2], submitted Nov. 24, 2020, 15 pages.
Nguyen-Phuoc et al., "RenderNet: A deep convolutional network for differentiable rendering from 3D shapes", in arXiv:1806.06575[cs.v3], submitted Apr. 1, 2019, 17 pages.
Convolutional neural network, Wikipedia, retrieved from https://en.wikipedia.org/wiki/Convolutional_neural_network, on Dec. 7, 2020, 25 pages.
Hamilton et al., "Inductive Representation Learning on Large Graphs", in 31st Conference on Neural Information Processing Systems (NIPS 2017), 2017, 19 pages.
Kipf et al., "Variational Graph Auto-Encoders", in arXiv:1611.07308v1 [stat.ML], submitted Nov. 21, 2016, 3 pages.
Cao et al., "MolGAN: An Implicit Generative Model For Small Molecular Graphs", in arXiv:1805.11973v1 [stat.ML], submitted May 30, 2018, 11 pages.
Chen et al., "Intelligent Home 3D: Automatic 3D-House Design from Linguistic Descriptions Only", in arXiv:2003.00397v1 [cs.CV], submitted Mar. 1, 2020, 14 pages.
Cucurull et al., "Context-Aware Visual Compatibility Prediction", in arXiv:1902.03646v2 [cs.CV], submitted Feb. 12, 2019, 10 pages.
Fan et al., "Labeled Graph Generative Adversarial Networks", in arXiv:1906.03220v1 [cs.LG], submitted Jun. 7, 2019, 14 pages.
Gong et al., "Exploiting Edge Features in Graph Neural Networks", in arXiv:1809.02709v2 [cs.LG], submitted Jan. 28, 2019, 10 pages.
Genghis Goodman, "A Machine Learning Approach to Artificial Floorplan Generation", University of Kentucky Theses and Dissertations-Computer Science, 2019, accessible at https://uknowledge.uky.edu/cs_etds/89, 40 pages.
Grover et al., "node2vec: Scalable Feature Learning for Networks", in arXiv:1607.00653v1 [cs.SI], submitted Jul. 3, 2016, 10 pages.
Nauata et al., "House-GAN: Relational Generative Adversarial Networks for Graph-constrained House Layout Generation", in arXiv:2003.06988v1 [cs.CV], submitted Mar. 16, 2020, 17 pages.
Kang et al., "A Review of Techniques for 3D Reconstruction of Indoor Environments", in ISPRS International Journal Of Geo-Information 2020, May 19, 2020, 31 pages.
Kipf et al., "Semi-Supervised Classification With Graph Convolutional Networks", in arXiv:1609.02907v4 [cs.LG], submitted Feb. 22, 2017, 14 pages.
Li et al., "Graph Matching Networks for Learning the Similarity of Graph Structured Objects", in Proceedings of the 36th International Conference on Machine Learning (PMLR 97), 2019, 18 pages.
Liu et al., "Hyperbolic Graph Neural Networks", in 33rd Conference on Neural Information Processing Systems (NeurIPS 2019), 2019, 12 pages.
Merrell et al., "Computer-Generated Residential Building Layouts", in ACM Transactions on Graphics, Dec. 2010, 13 pages.

* cited by examiner

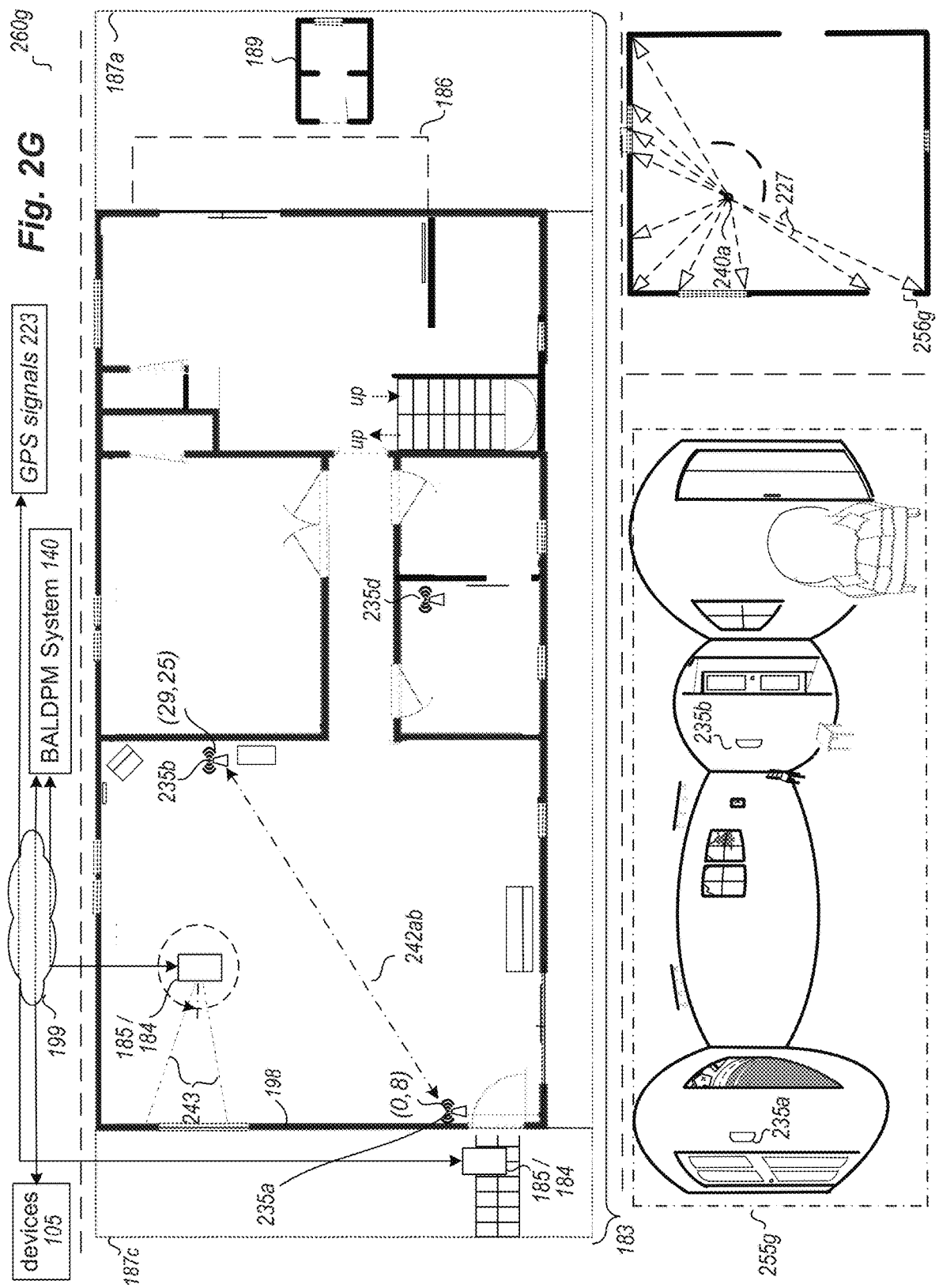

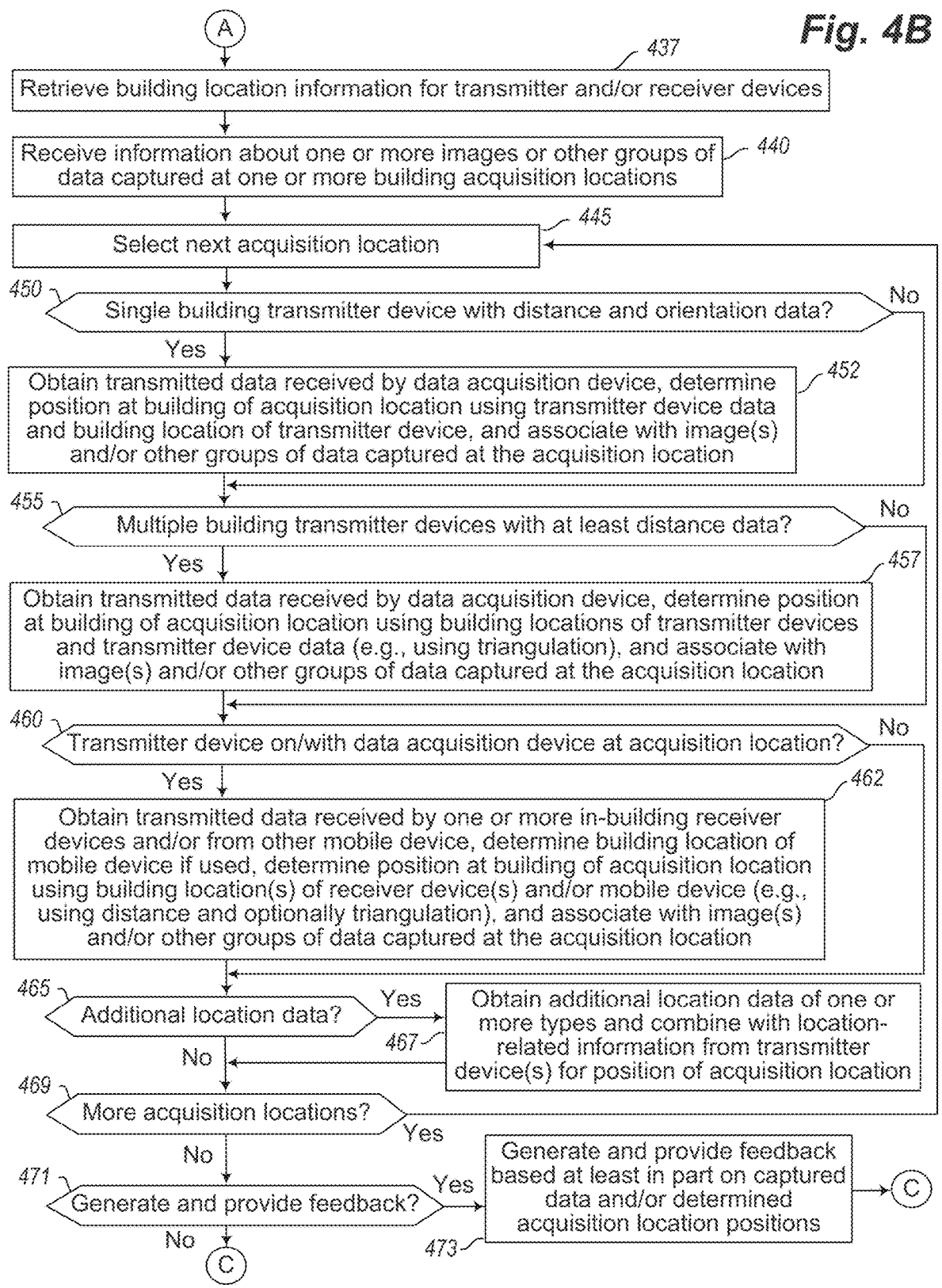

AUTOMATED LOCALIZATION USING BEACON TRANSMITTER DEVICES OF DATA ACQUIRED IN BUILDINGS

TECHNICAL FIELD

The following disclosure relates generally to techniques for using beacon transmitter devices in a building as part of automatically determining positions of the acquisition locations within the building at which data is acquired from an environment surrounding those acquisition locations, such as to determine positions of acquired images' acquisition locations in a building using a mesh network of multiple beacon transmitter devices in the building, and for subsequently using the determined acquisition location information and acquired data in one or more manners, such as to improve navigation of the building.

BACKGROUND

In various fields and circumstances, such as architectural analysis, property inspection, real estate acquisition and development, general contracting, improvement cost estimation, automated navigation, etc., it may be desirable to know the interior of a house, office, or other building without having to physically travel to and enter the building. However, it can be difficult to effectively acquire, represent and use such building interior information, including to display visual information acquired within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks, including that floor plans can be difficult to construct and maintain, to accurately scale and populate with information about room interiors, to visualize and otherwise use, etc.

BRIEF DESCRIPTION OF THE DRAWINGS

FIGS. 2A-2K illustrate examples of automatically analyzing information about a floor plan for a building and of automatically analyzing visual data taken in an interior of the building, such as to automatically determine and present an acquisition location of the image on the floor plan.

FIGS. 4A-4B illustrate an example embodiment of a flow diagram for a Building Acquisition Location Determination and Presentation Manager (BALDPM) system routine in accordance with an embodiment of the present disclosure.

DETAILED DESCRIPTION

Figure 1:
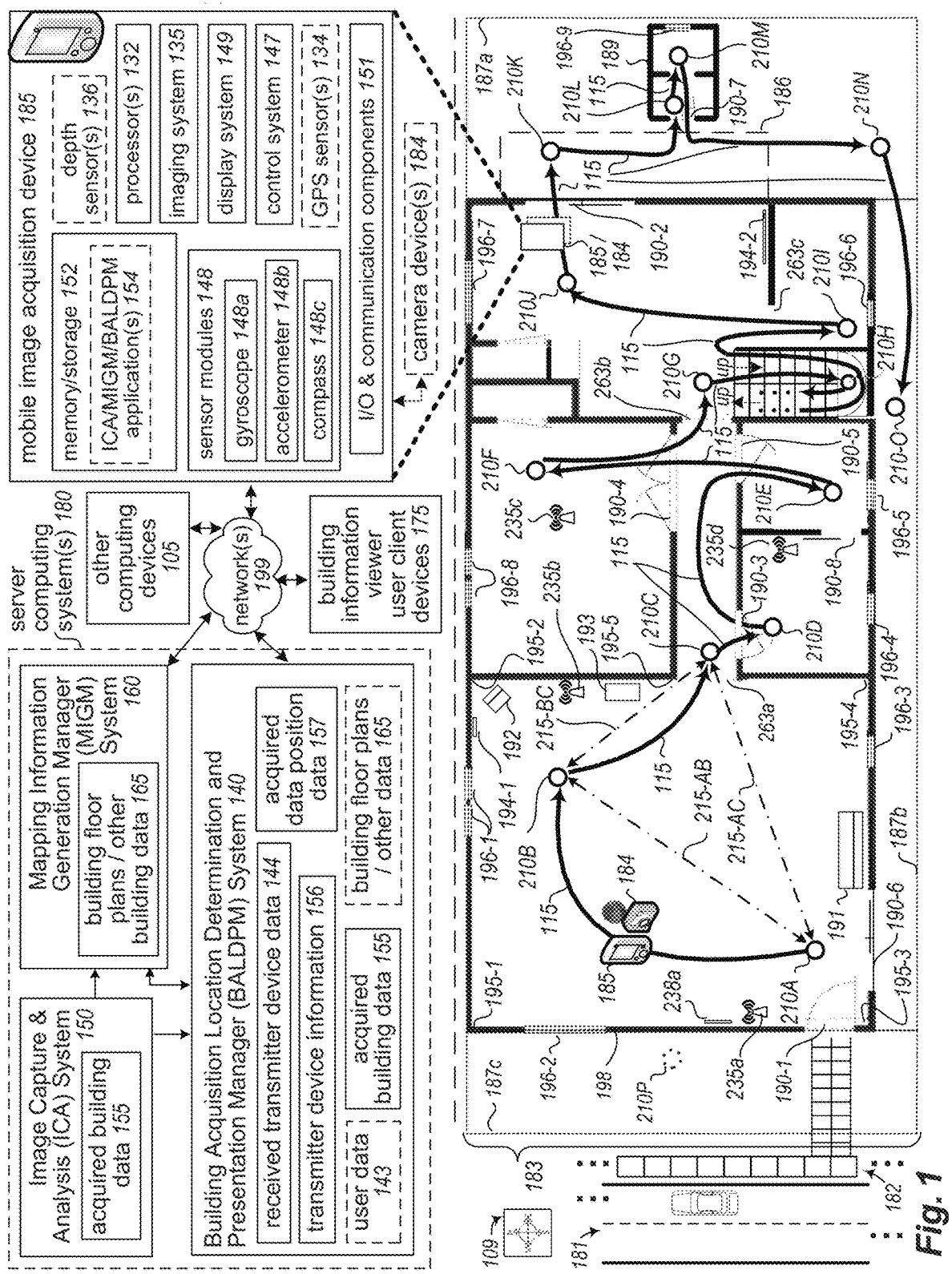
FIG. 1 includes a diagram depicting an exemplary building interior environment and computing system(s) for use in embodiments of the present disclosure, including to generate and present information representing an interior of the building.

The present disclosure describes techniques for using computing devices to perform automated operations related to using one or more beacon transmitter devices or other wireless transmitter devices at a building as part of determining the acquisition locations of images or other groups of data that are acquired at the building, and for subsequently using the acquired data and determined acquisition location information in one or more further automated manners. In at least some embodiments, the images and/or other acquired data may be analyzed to generate a floor plan and/or other mapping information for the building (e.g., a three-dimensional model of the building's interior, a linked group of images with inter-image directional information, etc.), such as by using visual data and determined acquisition locations of acquired images to determine room shapes and to position such room shapes relative to each other, or to otherwise determine relative positions of acquisition locations—in at least some such embodiments, the automated analysis and use of acquired images and/or other data is further performed without having or using any acquired depth data from any depth sensors or other distance-measuring devices about distances from an acquisition location to walls or other objects in the surrounding building. Such generated floor plans and/or other mapping information may be further used in various manners in various embodiments, such as for controlling navigation of mobile devices (e.g., autonomous vehicles), for display or other presentation on one or more client devices in corresponding GUIs (graphical user interfaces), etc. In addition, in at least some embodiments and situations, some or all of the automated acquisition location determination and/or automated analysis and use of acquired data may be performed on a mobile acquisition device used to acquire the data (e.g., a smart phone, tablet, etc.), and various feedback related to the automated operations may be further generated and presented on the mobile acquisition device (e.g., to guide further data acquisition activities). Additional details are included below regarding the automated acquisition of data and use of determined image acquisition location information, and some or all of the techniques described herein may in at least some embodiments be performed via automated operations of a Building Acquisition Location Determination and Presentation Manager ("BALDPM") system, as discussed further below.

As noted above, the automated operations of the BALDPM system may include using beacon transmitter devices or other wireless transmitter devices (referred to generally herein as "transmitter devices" or "transmitters") located in and around buildings to assist in determining acquisition locations of acquired images and/or other data in and around those buildings. Such transmitter devices may each be configured to transmit a unique identifier and optionally additional data within a range of the transmitter device, and may be of one or more types, such as beacon devices using Bluetooth or Bluetooth variants (e.g., Bluetooth Low Energy, or "BLE") or ultra-wideband ("UWB") radio transmission capabilities (e.g., having a transmission range of numerous meters or feet), Wi-Fi devices, infrared (IR) devices, RFID devices (e.g., having a range of a few meters or feet), near-field communications (NFC) devices (e.g., having a range of centimeters or inches), etc.—such beacon devices or other transmitter devices may further include devices that provide such transmissions in addition to other functionality (e.g., smart locks, electronic lockboxes, televisions, medical devices, smart home devices, etc.). In addition, in at least some embodiments and situations, some or all such transmitter devices may further include a beacon signal receiver or other wireless signal receiver (referred to generally herein as "receiver devices" or "receivers")—if so, a group of multiple such transmitter/receiver devices at a building may further create a mesh network by exchanging transmissions between the transmitter/receiver devices, such as to enable the transmitter/receiver devices and/or an associated computing device to determine at least positions of the transmitter/receiver devices relative to each other (e.g., in a common coordinate system), and optionally absolute positions (e.g., absolute coordinates, such as latitude and longitude, if an absolute location of at least one of the transmitter/receiver devices is known, such as by using GPS or other location determination capabilities).

The transmissions of such beacon transmitter devices or other wireless transmitter devices may be further used to determine positions of acquisition location at which data is acquired in various manners in various embodiments. For example, in at least some embodiments and situations, an acquisition device (e.g., a smartphone, tablet, etc.) may include a wireless signal receiver and optionally computing capabilities (e.g., one or more hardware processors), and while at an acquisition location at which one or more images or other data is acquired, the acquisition device may further receive wireless transmissions from one or more transmitter devices with known locations—in other embodiments and situations, the acquisition device may not itself have such a wireless signal receiver (e.g., for a stand-alone camera device), but may instead have a mobile companion device (e.g., a smartphone, tablet, etc.) at or near the location of the acquisition device that instead receives such wireless transmissions from the one or more transmitter devices. The acquisition device, companion device and/or other computing device(s) may then use information about the received wireless transmissions to determine the position of the acquisition location at the building. For example, one or more wireless transmissions received at an acquisition location from a single transmitter device having a known location may provide at least approximate information about a corresponding position of the acquisition location (e.g., an area in which the position is situated), such as based on a known range of the transmitter device's transmissions and/or range data provided by the transmitter device or otherwise determined by the user device (e.g., based on received signal strength of the transmissions, such as relative to the advertised signal strength leaving the transmitter device). Furthermore, information about a direction or orientation between the acquisition location and the transmitter device may be further determined in addition to a range in at least some embodiments and situations (e.g., using angle-of-arrival data for multiple antennas and/or by using other specialized hardware on a receiver device, such as by using UWB beacons and/or some types of Bluetooth-based beacons such as iBeacons)—if so, the position of the acquisition location based on a single transmitter device having a known location may be determined with a high degree of accuracy (e.g., within inches, a foot, etc.) using both the range and direction information. In other embodiments in which direction information is not available, a position of the acquisition location may still be determined with a high degree of accuracy based on concurrent or simultaneous wireless transmissions received from multiple transmitter devices having known locations, such as by geometric triangulation or other means. In addition, such acquisition location positions may be determined in a relative frame of reference in some embodiments or situations (e.g., relative to a fixed position, such as an entrance, a particular external corner of the building; as positions on a floor plan or otherwise within rooms or other areas; etc., including in a common coordinate system used by the transmitter devices), while in other embodiments the acquisition location positions may be determined as absolute locations (e.g., latitude and longitude coordinates). Furthermore, in some embodiments and situations, such a determination of an acquisition location position using information from one or more transmitter devices may be further supplemented or augmented with other types of location-related information, such as by doing further processing on the acquisition device, companion device and/or other computing device(s) to determine a position within a room or other area of the building (e.g., using visual data and/or additional sensor data, such as from one or more Inertial Measurement Units, or "IMUs", including by performing one or more of visual odometry, SLAM, SfM, etc.), by using GPS signals, etc. that is combined with the position information based on the transmitter device(s). Additional details about determining the position of an acquisition location in or around a building are included below.

In addition, such transmitter devices may be installed or otherwise placed in and around a building, such as temporarily (e.g., for minutes, hours, days, weeks, etc.), and in some cases before an acquisition session that acquires multiple images and/or other groups of data at multiple acquisition locations (e.g., over a period of minutes or hours) and with the transmitter devices removed after the acquisition session ends—as part of such transmitter device placement, the locations of some or all of the transmitter devices may in some embodiments and situations be manually recorded and provided to the BALDPM system, while in other embodiments and situations the locations of some or all of the transmitter devices may be automatically determined (e.g., using a mesh network of the transmitter devices, such as before the acquisition of data; concurrent with determining positions of multiple acquisition locations during data acquisition, such as using triangulation and/or constraint-based determinations to simultaneously and iteratively narrow the locations of both the transmitter devices and the acquisition location positions; etc.). Non-exclusive examples of such transmitter device placement includes the following: multiple transmitter devices installed or otherwise placed in multiple locations at a building, such as inside and/or outside the building (e.g., one or more transmitter devices in each of some or all rooms of the building and optionally with a transmitter device installed or otherwise placed near an entrance to the building), such as with aggregate range to cover some or all of the building and/or of a property on which the building is situated; a single transmitter device installed or otherwise placed in a single location within a building, such as with a range to cover some or all of the building and/or of a property on which the building is situated; etc. In addition, in some embodiments and situations, some or all such transmitter devices may be moved between buildings to support consecutive acquisition location position determinations in each of the buildings. Furthermore, in at least some embodiments and situations, one or more mobile devices with wireless transmission capabilities may be used as wireless transmitter devices in a building (whether in addition to or instead of other wireless transmitter devices that are installed or otherwise placed at fixed locations), such as a mobile companion device for an acquisition device that is near the acquisition device and moves along with it, and with a current location of such a mobile device at a time of data acquisition being determined by the mobile device and/or another device in various manners (e.g., using GPS signals, using other device location capabilities, etc.). Additional details about transmitter devices and their uses are included below.

In addition, in at least some embodiments and situations, a camera or other acquisition device may lack a wireless signal receiver but may include or be associated with a wireless transmitter (e.g., have a mobile companion device proximate to the acquisition device that acts as a wireless transmitter device, have a temporarily attached wireless transmitter device; etc.), and one or more wireless receiver devices may be located at the building—such wireless receiver devices may, for example, be installed or otherwise placed at one or more fixed locations in or around the building, and/or may in some embodiments and situations include a mobile companion device or other mobile device in the building that has a determined current location at a time of acquiring data (whether in addition to or instead of other wireless receiver devices at fixed locations). In such embodiments and situations, the wireless transmitter associated with the acquisition device may transmit wireless signals from or near the acquisition location while the acquisition device is at an acquisition location, and one or more receiver devices at the building may receive the wireless signal transmissions and use them to determine the position of the acquisition location of the acquisition device in a manner similar to that described above (e.g., to determine the position of the wireless transmitter, and optionally to adjust the position based on differences between the position of the wireless transmitter and acquisition device if needed). As one non-exclusive example, a single acquisition device with an associated wireless transmitter and single mobile companion device with a wireless receiver may be used to determine acquisition location positions if the location of the mobile companion device is independently determined by the mobile companion device or other device—similarly, a single acquisition device with an associated wireless receiver and single mobile companion device with a wireless transmitter may be used to determine acquisition location positions if the location of the mobile companion device is independently determined by the mobile companion device or other device. Additional details about use of an acquisition device with associated wireless transmitter device are included below.

As is also noted above, the automated operations of the BALDPM system may include generating and presenting various feedback during the determination of one or more acquisition location positions (e.g., during an image acquisition session or other data acquisition session), such as to control or otherwise direct the acquisition of additional images and/or other data (e.g., during the current acquisition session). Such feedback may have various forms in various embodiments and situations, with non-exclusive examples including one or more of the following: a partial or completed generated floor plan (e.g., showing positions of one or more acquisition locations at which data has already been acquired), such as to illustrate additional rooms or other areas of the building at which to acquire additional data (e.g., to complete the floor plan); information about quality and/or completeness for one or more images or other groups of data that have been acquired; directions to move to a new building location and/or to perform other activities to improve quality and/or completeness of the acquired data and/or associated generated mapping information for the building; etc. Additional details about generating and presenting such feedback are included below.

In at least some embodiments, images that are acquired and analyzed may include one or more panorama images or other images (e.g., rectilinear perspective images) acquired at acquisition locations in or around a multi-room building (e.g., a house, office, etc.), such as to generate a panorama image at each of multiple such acquisition locations from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous acquisition of all the visual data (e.g., using one or more fisheye lenses), etc. It will be appreciated that such a panorama image may in some situations be presented using an equirectangular projection (with vertical lines and other vertical information in an environment being shown as straight lines in the projection, and with horizontal lines and other horizontal information in the environment being shown in the projection in a curved manner if they are above or below a horizontal centerline of the image and with an amount of curvature increasing as a distance from the horizontal centerline increases and/or a distance from the acquisition location decreases) and provide up to 360° coverage around horizontal and/or vertical axes, such that a user viewing a starting panorama image may move the viewing direction within the starting panorama image to different orientations to cause different images (or "views") to be rendered within the starting panorama image (including to present the image being rendered as a perspective image using a planar coordinate system). Furthermore, acquisition metadata regarding the acquisition of images and/or other data may be obtained and used in various manners in some embodiments, such as data acquired from IMU (inertial measurement unit) sensors or other sensors of a mobile device as it is carried by a user or otherwise moved between acquisition locations, while in other embodiments such acquisition metadata is not acquired or used (e.g., so as to determine information from an acquired image based solely on the visual data of the image). In addition, groups of data of types other than images may be acquired and used in some embodiments and situations (e.g., video with at least visual data and optionally audio data; audio data, such as recordings of ambient noises or other environmental sounds, recordings of spoken descriptions of the building and/or of particular attributes of the building and its rooms and other areas, etc.; other types of acquired data readings, such as one or more gases and/or one or more types of radiation or other energy and/or one or more types of wireless signals; etc.), whether in addition to or instead of images. In addition, the determined acquisition location information for acquired data may include at least a position on a floor plan of the building and in some situations further includes an orientation or other direction information (e.g., a pose of a camera device or other acquisition device used to acquire images), and in some embodiments the determined acquisition location information may further be represented in a common coordinate system extending through some or all of the building and optionally external areas around the building (e.g., as absolute location coordinates, such as using latitude and longitude; as relative location coordinates, such as relative to a position of a selected transmitter device and/or other location; etc.).

The described techniques provide various benefits in various embodiments, including to allow floor plans of multi-room buildings and other structures to be automatically generated based on images and/or other data acquired in or around the buildings or other structures, and/or to be automatically augmented with information about acquisition locations at which images and/or other data are acquired in or around the buildings or other structures, including in some embodiments without having or using information from depth sensors or other distance-measuring devices about distances from images' acquisition locations to walls or other objects in a surrounding building or other structure. In addition, using wireless transmitter devices and/or wireless receiver devices for determination of acquisition location position provides various benefits relative to other techniques for acquisition location position determination, such as based on analysis and comparison of visual data of multiple images (optionally in combination with IMU data, such as for SLAM and/or SfM), based on use of GPS data or other positioning data, etc., including more accurate position determination (including in situations where GPS signals may be weak or unavailable, such as inside buildings), position determination in additional situations not previously available (including in situations where visual odometry and/or IMU-based techniques perform poorly or not at all, such as for acquisition locations both inside and outside a building), etc. Furthermore, such automated techniques allow acquisition location information to be determined more quickly than previously existing techniques, and in at least some embodiments with greater accuracy, including by using information acquired from the actual building environment (rather than from plans on how the building should theoretically be constructed), as well as enabling the acquisition of information about changes to structural elements that occur after a building is initially constructed if a corresponding building floor plan reflects that actual building environment and/or such changes. Such described techniques further provide benefits in allowing improved automated navigation of a building by mobile devices (e.g., semi-autonomous or fully-autonomous vehicles), based at least in part on the determined acquisition locations of images, including to significantly reduce computing power and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

In some embodiments and situations, automated operations of a BALDPM system may include determining the acquisition location of an image that is acquired in a defined area of a building (e.g., in a room of a house or other building) in a manner that is further based at least in part on an analysis of the visual information included in the image's contents. In at least some embodiments, such a BALDPM system may operate in conjunction with one or more separate ICA (Image Capture and Analysis) systems and/or with one or more separate MIGM (Mapping Information and Generation Manager) systems, such as to obtain and use floor plans and other associated information for buildings from the MIGM system and/or to obtain images to be localized for a building from the ICA system, while in other embodiments such a BALDPM system may incorporate some or all functionality of such ICA and/or MIGM systems as part of the BALDPM system. In yet other embodiments, the BALDPM system may operate without using some or all functionality of the ICA and/or MIGM systems, such as if the BALDPM system obtains information about building floor plans and/or other associated information from other sources (e.g., from manual creation by one or more users, from provision of such building floor plans and/or associated information by one or more external systems or other sources, etc.), and/or if the BALDPM system obtains information about images to be localized from other sources (e.g., from end users, such as in a crowdsourced manner). In addition, building floor plans that are used in the manner described herein may be in various formats (whether as originally obtained and/or after an initial automated analysis by the BALDPM system), including in at least some embodiments to be in a vectorized form with specified information about the locations of structural elements such as one or more of the following: walls, windows, doorways and other inter-room openings, corners, etc. (e.g., after initially receiving a non-vectorized image form of the building floor plan that is analyzed to produce the vectorized form).

With respect to functionality of such an ICA system, it may perform automated operations in at least some embodiments to acquire images (e.g., panorama images) and optionally additional data at various acquisition locations associated with a building (e.g., in the interior of multiple rooms of the building), and optionally further acquire metadata related to the acquisition process (e.g., image pose information, such as using compass headings and/or GPS-based locations) and/or to movement of an acquisition device between acquisition locations—in at least some embodiments, such acquisition and subsequent use of acquired data may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses or other lenses and mounted on a rotatable tripod or otherwise having an automated rotation mechanism; a camera having one or more fisheye lenses sufficient to acquire 360° horizontally without rotation; a smartphone with one or more lenses that is held and moved by a user, such as to rotate the user's body and held smartphone in a 360° circle around a vertical axis; a camera held by or mounted on a user or the user's clothing; a camera mounted on an aerial and/or ground-based drone or other robotic device able to move under its own power; etc.) to acquire visual data from a sequence of multiple acquisition locations within multiple rooms of a house (or other building); etc. Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images and/or other images that have been acquired for a building interior (and optionally an exterior of the building), and generate a corresponding floor plan for the building, such as by determining room shapes and locations of passages connecting rooms for some or all of those panorama images, as well as by determining structural wall elements and optionally other objects in some or all rooms of the building in at least some embodiments and situations. The types of structural wall elements corresponding to connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) acquired within the building interior to determine particular objects and attributes (e.g., a color and/or material type and/or other characteristics of particular structural elements or other objects, such as a floor, wall, ceiling, countertop, furniture, fixture, appliance, cabinet, island, fireplace, etc.; the presence and/or absence of particular objects or other elements; etc.), or to otherwise determine relevant attributes (e.g., directions that building objects face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of data structures (e.g., floor plans, virtual tours of inter-linked images, graphs or other representations of mesh networks of transmission devices, etc.) are generated and used in specific manners in some embodiments, it will be appreciated that other types of information to describe buildings may be similarly generated and used in other embodiments, including for buildings (or other structures or layouts) separate from houses, and that determined and generated information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device, including by one or more camera lenses and/or associated imaging systems (e.g., including one or more image sensors) that acquire image data and other visual data. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1 includes an example block diagram of various computing devices and systems that may participate in the described techniques in some embodiments, such as with respect to an illustrated example of part of a building 198 (in this example, house 198) on property 183, and by the Building Acquisition Location Determination and Presentation Manager ("BALDPM") system 140 executing at least in part on one or more server computing systems 180 in this example embodiment—in the illustrated embodiment, client applications 154 for one or more of the BALDPM system and/or the ICA system and/or the MIGM system may execute on each of the acquisition devices 185, a BALDPM client application or other building information viewer system (not shown) may execute on each of one or more mobile user devices 175, and in other embodiments and situations, some or all of the BALDPM system and/or the ICA system and/or the MIGM system may execute on some or all mobile devices 185 (e.g., in a distributed manner).

In the illustrated embodiment, the BALDPM system 140 obtains images and/or other groups of data 155 acquired at one or more acquisition locations in each of one or more buildings, such as generated by the ICA system 150, and optionally building floor plans and other building data 165 for some or all of those buildings, such as generated by the MIGM system 160. The BALDPM system 140 further obtains transmitter device data 144 received at acquisition locations at which the images and/or other data groups are acquired, information 156 about transmitter device locations and optionally other information (e.g., types, capabilities, etc.), and uses the transmitter device data to determine positions of the acquisition location(s) 157 (e.g., relative to the transmitter device locations)—in at least some embodiments and situations, the acquisition location position determination is performed concurrent with the data acquisition (e.g., in a real-time or near-real-time manner, such as within milliseconds, seconds, minutes, etc. of the data acquisition). The BALDPM system 140 may optionally further use supporting information supplied by system operator users via computing devices 105 over intervening computer network(s) 199 in some embodiments and situations (e.g., to receive and store location information for wireless transmitter devices and/or wireless receiver devices). Such ICA system 150 and/or MIGM system 160 may in some embodiments execute on the same server computing system(s) 180 as the BALDPM system (e.g., with all systems being operated by a single entity or otherwise being executed in coordination with each other, such as with some or all functionality of all the systems integrated together), and in some embodiments the ICA system 150 and/or MIGM system 160 may operate on one or more other systems separate from the system(s) 180 (e.g., on one or more mobile image acquisition devices 185 and/or mobile user devices 175 and/or other computing systems, not shown), whether instead of or in addition to the copies of those systems executing on the system(s) 180 (e.g., to have a copy of the MIGM system 160 executing on the device 185 to incrementally generate at least partial building floor plans as building images are acquired by the ICA system 160 executing on the device 185 and/or by that copy of the MIGM system, while another copy of the MIGM system optionally executes on one or more server computing systems to generate a final complete building floor plan after all images are acquired; etc.). In addition, building information may in some embodiments be obtained by the BALDPM system in manners other than via ICA and/or MIGM systems (e.g., if such ICA and/or MIGM systems are not part of the BALDPM system), such as to receive building images and/or other data and/or floor plans from other sources.

As noted above, the BALDPM system 140 obtains transmitter device data 144 received at acquisition locations at which the images and/or other data groups are acquired, information 156 about transmitter device locations and optionally other information (e.g., types, capabilities, etc.), and uses the transmitter device data to determine positions of the acquisition location(s) 157. In particular, the BALDPM system 140 may store various transmitter device information 156 (e.g., transmitter identifiers, associated building locations, etc.), and when an acquisition device 185 at a building provides to the BALDPM system 140 transmitter device data 144 that it receives from one or more wireless transmitter devices at the building and optionally additional data (e.g., other location data), the BALDPM system may determine position information for the acquisition locations and provide that determined acquisition location position information to the acquisition device 185. Other data 143 may also be optionally stored and used, including about users of acquisition devices 185 and/or other client devices 175 (e.g., as part of associated accounts at the BALDPM system), such as preference-related data (e.g., for use in personalizing information and/or functionality provided to the user, including feedback related to the data acquisition activities). The BALDPM system 140 may further perform other activities, such as to determine transmitter device locations for buildings in which transmitter devices are already present and/or in which transmitter devices are to be placed, to update the transmitter device information (e.g., associated locations if mobile or otherwise repositioned), etc. Additional details related to the automated operations of the BALDPM system are included elsewhere herein, including with respect to FIGS. 2E-2K and FIGS. 4A-4B.

In this example, an Interior Capture and Analysis ("ICA") system (e.g., an ICA system 150 executing on the one or more server computing systems 180, such as part of or associated with the BALDPM system; an ICA system application 154 executing on a mobile image acquisition device 185; etc.) is also illustrated and acquires data 155 with respect to one or more buildings or other structures (e.g., by acquiring one or more 360° panorama images and/or other images for multiple acquisition locations 210 in example house 198), and a MIGM (Mapping Information Generation Manager) system 160 executing on the one or more server computing systems 180 (e.g., as part of or otherwise associated with the BALDPM system) further uses that acquired building information and optionally additional supporting information (e.g., supplied by system operator users via computing devices 105 over intervening computer network(s) 199) to generate and provide building floor plans 165 and/or other mapping-related information (not shown) for the building(s) or other structure(s). Additional details related to the automated operation of the ICA and MIGM systems are included elsewhere herein, including with respect to FIGS. 2A-2D and with respect to FIGS. 5 and 6A-6B, respectively.

Various components of the mobile image acquisition computing device 185 are also illustrated in FIG. 1, including one or more hardware processors 132 (e.g., CPUs, GPUs, etc.) that execute software (e.g., ICA and/or MIGM and/or BALDPM application 154, optional browser or other software program(s), etc.) using executable instructions stored and/or loaded on one or more memory/storage components 152 of the device 185, and optionally one or more imaging systems 135 of one or more types (e.g., including one or more cameras with one or more lenses and one or more image sensors) to acquire visual data of one or more panorama images 165 and/or other images (not shown, such as rectilinear perspective images)—some or all such images 155 may in some embodiments be supplied by one or more separate associated camera devices 184 (e.g., via a wired/cabled connection, via Bluetooth or other inter-device wireless communications, etc.), whether in addition to or instead of images acquired by the mobile device 185, and such as with the mobile device 185 optionally acting as a mobile companion device for the camera device and optionally having a wireless transmitter and/or receiver to use in exchanging wireless transmissions with a corresponding wireless receiver and/or transmitter on or associated with the camera device 184. The illustrated embodiment of mobile device 185 further includes one or more sensor modules 148 that include a gyroscope 148a, accelerometer 148b and compass 148c in this example (e.g., as part of one or more IMUs, or inertial measurement units, on the mobile device, not shown separately), one or more control systems 147 managing I/O (input/output) and/or communications and/or networking for the device 185 (e.g., to receive instructions from and present information to the user) such as for other device I/O and communication components 151 (e.g., network interfaces or other connections, keyboards, mice or other pointing devices, microphones, speakers, GPS receivers, etc.), a display system 149 (e.g., including one or more displays, optionally with touch-sensitive screens), optionally one or more depth-sensing sensors or other distance-measuring components 136 of one or more types, optionally a GPS (or Global Positioning System) sensor 134 or other position determination sensor (not shown in this example), optionally other components (e.g., one or more lighting components), etc. Other devices/systems 105, 175 and 180 and/or camera devices 184 may each include various hardware components and stored information in a manner analogous to mobile device 185, which are not shown in this example for the sake of brevity, and as discussed in greater detail below with respect to FIG. 3.

One or more users (e.g., end-users, not shown) of one or more mobile client devices 175 may further interact over one or more computer networks 199 with the BALDPM system 140 (and optionally the ICA system 150 and/or MIGM system 160), and/or with some or all of the BALDPM system executing on that device 175 (not shown), such as to participate in acquiring target images in or around a building using one or more cameras of the device 175 or otherwise providing user-supplied information, displaying received building data, etc. Such mobile devices 175 may each execute a BALDPM client application or other building information viewer system (not shown) that is used to interact with the BALDPM system to request and receive building information, to present such received building information and/or other received information on that mobile device (e.g., as part of a GUI displayed on that mobile device), and further optionally receive and respond to interactions by one or more users with the presented information (e.g., with displayed user-selectable controls, such as part of the generated visual data enhancements), as discussed in greater detail elsewhere herein, including with respect to FIG. 7. Interactions by the user(s) may include, for example, specifying criteria to use in providing building information (e.g., criteria about building attributes of interest to a user), obtaining and optionally requesting information for one or more indicated buildings (e.g., at which the user's mobile device is located, such as by supplying one or more target images acquired at a building) and interacting with corresponding provided building information—non-exclusive examples of interactions with displayed or otherwise presented information includes the following: to view building information, such as part of provided descriptive building data; to select user-selectable controls that are provided with provided building data, such as included in visual data enhancements overlaid on a target image, including to interact with one or more displayed visual indicators and/or textual descriptions associated with a particular building object or other building attribute, such as to obtain further data related to that building object or other building attribute; to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed; etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1, in some embodiments the client devices 175 (or other devices, not shown) may receive and use information about buildings (e.g., identified floor plans and/or other mapping-related information) in additional manners, such as to control or assist automated navigation activities by those devices (e.g., by autonomous vehicles or other devices), whether instead of or in addition to display of the identified information.

In the depicted computing environment of FIG. 1, the network 199 may be one or more publicly accessible linked networks, possibly operated by various distinct parties, such as the Internet. In other implementations, the network 199 may have other forms. For example, the network 199 may instead be a private network, such as a corporate or university network that is wholly or partially inaccessible to non-privileged users. In still other implementations, the network 199 may include both private and public networks, with one or more of the private networks having access to and/or from one or more of the public networks. Furthermore, the network 199 may include various types of wired and/or wireless networks in various situations. In addition, the client devices 175 and server computing systems 180 may include various hardware components and stored information, as discussed in greater detail below with respect to FIG. 3.

In the example of FIG. 1, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185 and/or associated camera devices 184, and for use in generating and providing a representation of an interior of the building or other structure. For example, in at least some such embodiments, such techniques may include using one or more mobile devices (e.g., a camera having one or more fisheye lenses and/or other lenses and mounted on a rotatable tripod or otherwise having an automated rotation mechanism; a camera having sufficient fisheye lenses and/or other lenses to acquire 360° horizontally without rotation; a camera of a smartphone or separate device held by or mounted on a user or the user's clothing and using one or more non-fisheye lenses, such as wide-angle rectilinear lenses and/or telephoto lenses and/or macro lenses and/or standard lenses; etc.) to acquire data from a sequence of multiple acquisition locations within multiple rooms of a house (or other building), and to optionally further acquire data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is acquired, the techniques may include producing a 360° panorama image from that acquisition location with 360° of horizontal information around a vertical axis (e.g., a 360° panorama image that shows the surrounding room in an equirectangular format), and then providing the panorama images for subsequent use by the MIGM and/or BALDPM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S.

Non-Provisional patent application Ser. No. 16/236,187, filed Dec. 28, 2018 and entitled "Automated Control Of Image Acquisition Via Use Of Acquisition device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

In addition, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end-user's interactions with a displayed or otherwise generated 2D floor plan of a building may include one or more of the following: to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distortions present in the original panorama image; etc. Additional details regarding example embodiments of systems to provide or otherwise support at least some functionality of a building information viewer system and routine as discussed herein, including to display various types of information related to a building of interest and such as by a BIIP (Building Information Integrated Presentation) system and/or an ILTM (Image Locations Transition Manager) system and/or a BMLSM (Building Map Lighting Simulation Manager) system, are included in U.S. Non-Provisional patent application Ser. No. 16/681,787, filed Nov. 12, 2019 and entitled "Presenting Integrated Building Information Using Three-Dimensional Building Models," in U.S. Non-Provisional patent application Ser. No. 16/841,581, filed Apr. 6, 2020 and entitled "Providing Simulated Lighting Information For Three-Dimensional Building Models," and in U.S. Non-Provisional patent application Ser. No. 15/950,881, filed Apr. 11, 2018 and entitled "Presenting Image Transition Sequences Between Acquisition locations," each of which is incorporated herein by reference in its entirety. In addition, while not illustrated in FIG. 1, in some embodiments the client devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

FIG. 1 further depicts an exemplary building interior environment in which various transmitter devices 235 are placed and used to provide location-related functionality by the BALDPM system for acquisition devices 185 moving through the building (e.g., including example transmitter devices 235a-d in this example) and acquiring 360° panorama images and/or other images, such as by the ICA system and for use by the MIGM system (e.g., under control of the BALDPM system) to generate and provide one or more corresponding building floor plans (e.g., multiple incremental partial building floor plans) and/or to further use such building information as part of automated building information generation operations. In particular, FIG. 1 illustrates one story of a multi-story house (or other building) 198 with an interior that was acquired at least in part via multiple panorama images, such as by a mobile image acquisition device 185 with image acquisition capabilities and/or one or more associated camera devices 184 as they are moved through the building interior to a sequence of multiple acquisition locations 210 (e.g., starting at acquisition location 210A, moving to acquisition location 210B along travel path 115, etc., and ending at acquisition location 210-O or 210P outside of the building). An embodiment of the ICA system may automatically perform or assist in the acquiring of the data representing the building interior (as well as to further analyze the acquired data to generate 360° panorama images to provide a visual representation of the building interior), and an embodiment of the MIGM system may analyze the visual data of the acquired images to generate one or more building floor plans for the house 198 (e.g., multiple incremental building floor plans). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on elements in different images but without using any data from any such depth sensors, while in other embodiments such depth data may be used. In addition, while directional indicator 109 is provided in FIG. 1 for reference of the reader relative to the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 185 and/or camera device(s) 184 arrive at a first acquisition location 210A within a first room of the building interior (in this example, in a living room accessible via an external door 190-1), and acquires an image with a view of a portion of the building interior that is visible from that acquisition location 210A (e.g., some or all of the first room, and optionally small portions of one or more other adjacent or nearby rooms, such as through doorway wall openings, non-doorway wall openings, hallways, stairways or other connecting passages from the first room). The image acquisition may be performed in various manners as discussed herein, and may include visual data about a number of structural elements or other objects that are visible from the acquisition location—in the example of FIG. 1, such objects within the building 198 include the walls, floors, ceilings, doorways 190 (including 190-1 through 190-6, such as with swinging and/or sliding doors), windows 196 (including 196-1 through 196-8), borders between walls and other walls/ceilings/floors such as for inter-wall corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1), various built-in appliances or other fixtures or other structural elements (not shown in FIG. 1), etc. The user may also optionally provide a textual or auditory label identifier to be associated with an acquisition location and/or a surrounding room, such as "living room" for one of acquisition locations 210A or 210B or for the room including acquisition locations 210A and/or 210B, and/or a descriptive annotation with one or more phrases or sentences about a room and/or one or more objects in the room, while in other embodiments the ICA and/or MIGM system may automatically generate such identifiers and/or annotations (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been acquired, the mobile device 185 and/or camera device(s) 184 may be moved or move under their own power to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 185 and/or camera device(s) 184 may similarly acquire a 360° panorama image and/or other type of image from that acquisition location. This process may repeat for some or all rooms of the building 198 and in some cases parts of the property 183 external to the building, as illustrated for additional acquisition locations 210C-210P in this example, including in this example to acquire target panorama image(s) on an external deck or patio or balcony area 186, on a larger external back yard or patio area 187a, in a separate side yard area 187b, near or in an external additional accessory structure area 189 (e.g., a garage, shed, accessory dwelling unit, greenhouse, gazebo, car port, etc.) that may have one or more rooms, in a front yard 187c outside the external doorway 190-1 (e.g., during a different image acquisition session than used to acquire some or all of the other target images, such as with images for acquisition locations 210A to 210-O being acquired in a single image acquisition session in a substantially continuous manner that occurs within a period of time such as 5 minutes or 15 minutes or 30 minutes), and in other embodiments and situations from further acquisition locations (not shown) on an adjoining street or road 181 and/or sidewalk 182, from one or more overhead locations (e.g., from a drone, airplane, satellite, etc., not shown), etc. The acquired images for each acquisition location may be further analyzed, including in some embodiments to render or otherwise place each panorama image in an equirectangular format, whether at the time of image acquisition or later, as well as further analyzed by the MIGM and/or BALDPM systems in the manners described herein.

Various details are provided with respect to FIG. 1, but it will be appreciated that the provided details are non-exclusive examples included for illustrative purposes, and other embodiments may be performed in other manners without some or all such details.

FIGS. 2A-2K illustrate examples of automatically determining positions of the acquisition locations within the building at which images and/or other data is acquired, such as to automatically determine and present an acquisition location of an image on a floor plan (e.g., for a building 198 discussed further with respect to FIG. 1).

Figure 2A:
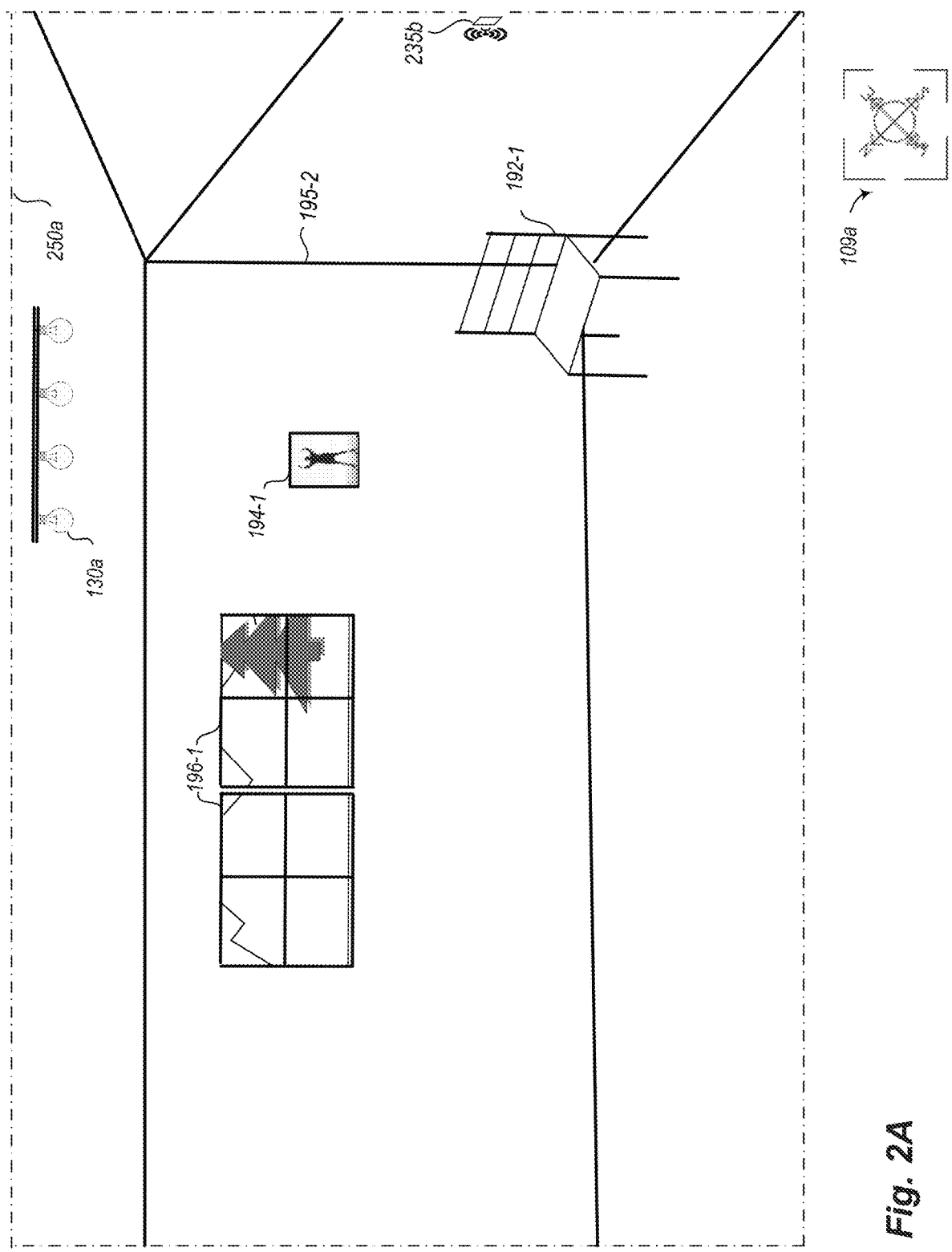

In particular, FIG. 2A illustrates an example image 250a, such as a non-panorama perspective image taken in a northeasterly direction from acquisition location 210B in the living room of house 198 of FIG. 1 (or a northeasterly facing subset view of a 360° panorama image taken from that acquisition location and formatted in a rectilinear manner)— the directional indicator 109a is further displayed in this example to illustrate the northeasterly direction in which the image is taken. In the illustrated example, the displayed image includes built-in elements (e.g., light fixture 130a, two windows 196-1, etc.), furniture (e.g., chair 192-1), and a picture 194-1 hanging on the north wall of the living room, as well as the wireless transmitter device 235b. No inter-room passages into or out of the living room (e.g., doorways or other wall openings) are visible in this image. However, multiple room borders are visible in the image 250a, including horizontal wall-ceiling and wall-floor borders between a visible portion of the north wall of the living room and the living room's ceiling and floor, horizontal wall-ceiling and wall-floor borders between a visible portion of the east wall of the living room and the living room's ceiling and floor, and the inter-wall vertical border 195-2 between the north and east walls.

Figure 2B:
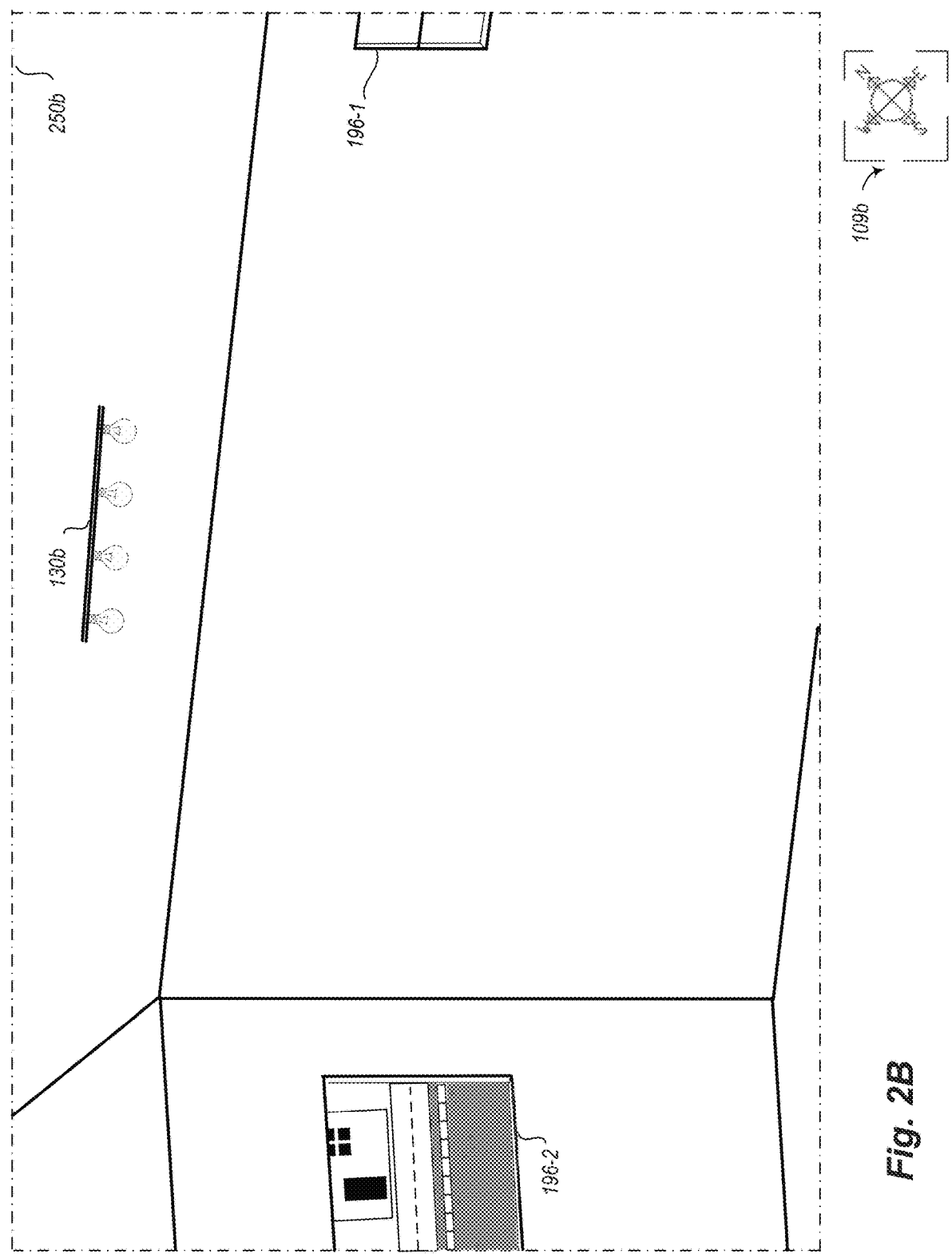

FIG. 2B continues the example of FIG. 2A, and illustrates an additional perspective image 250b taken in a northwesterly direction from acquisition location 210B in the living room of house 198 of FIG. 1 (or a northwesterly facing subset view of a 360° panorama image taken from that acquisition location and formatted in a rectilinear manner, such as the same 360° panorama image mentioned with respect to FIG. 2A)—the directional indicator 109b is further displayed to illustrate the northwesterly direction in which the image is taken. In this example image, a small portion of one of the windows 196-1 continues to be visible, along with a portion of window 196-2 and a new lighting fixture 130b. Horizontal and vertical room borders are also visible in image 250b in a manner similar to FIG. 2A.

Figure 2C:
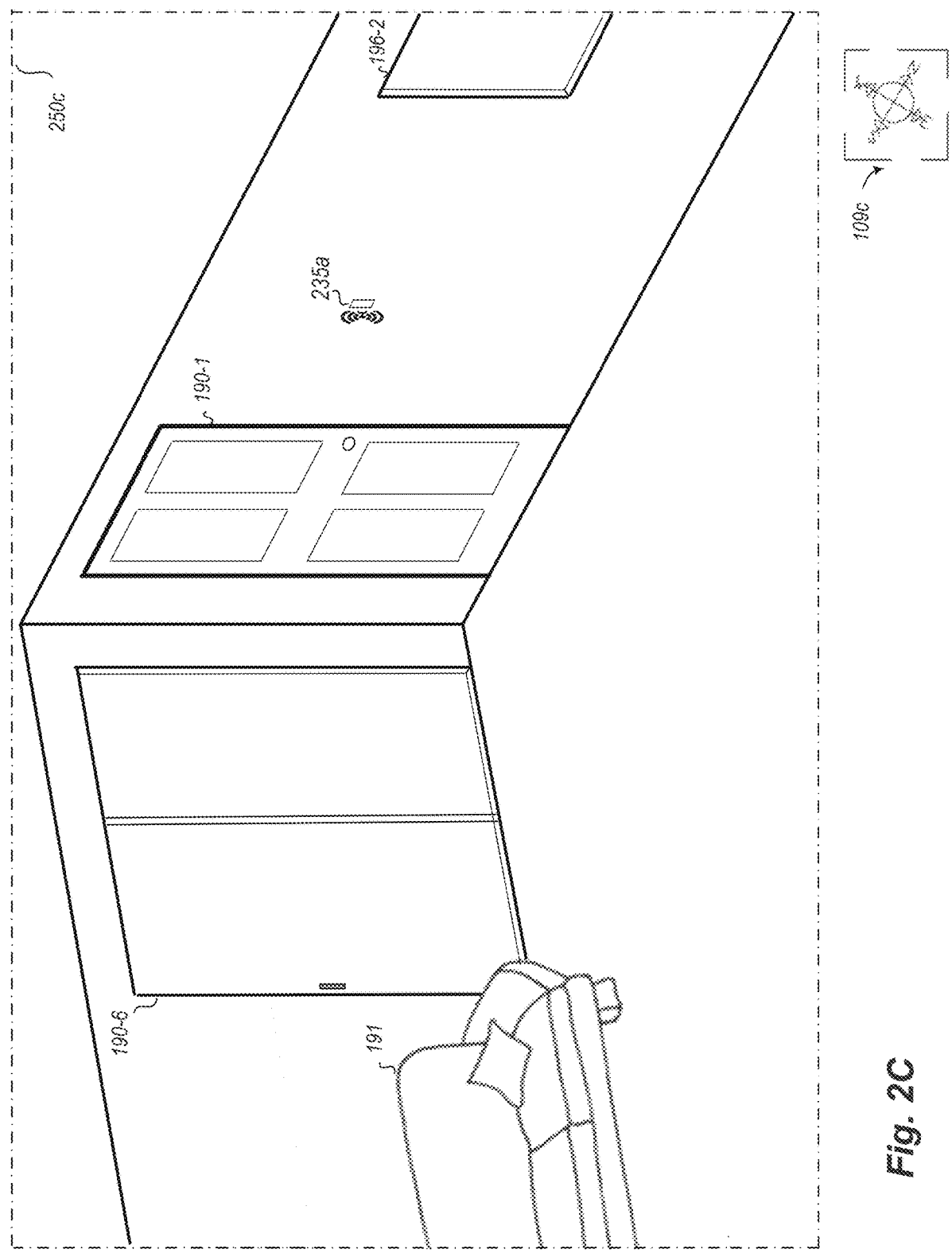

FIG. 2C continues the examples of FIGS. 2A-2B, and illustrates a third perspective image 250c taken in a southwesterly direction in the living room of house 198 of FIG. 1, such as from acquisition location 210B (or a southwesterly facing subset view of a 360° panorama image taken from that acquisition location and formatted in a rectilinear manner, such as the same 360° panorama image mentioned with respect to FIGS. 2A and 2B)—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B, as well as the wireless transmitter device 235a. This example image further illustrates two inter-room passages for the living room, which in this example include a doorway 190-1 with a swinging door to enter and leave the living room (which FIG. 1 identifies as a door to the exterior of the house, such as the front yard 187c and subsequent sidewalk 192 and street or road 181, as shown in FIG. 1), and a doorway 190-6 with a sliding door to move between the living room and side yard 187b—as is shown in the information in FIG. 1, an additional non-doorway wall opening 263a exists in the east wall of the living room to move between the living room and hallway, but is not visible in the images 250a-250c. It will be appreciated that a variety of other perspective images may be taken from acquisition location 210B and/or other acquisition locations and displayed in a similar manner.

Figure 2D:
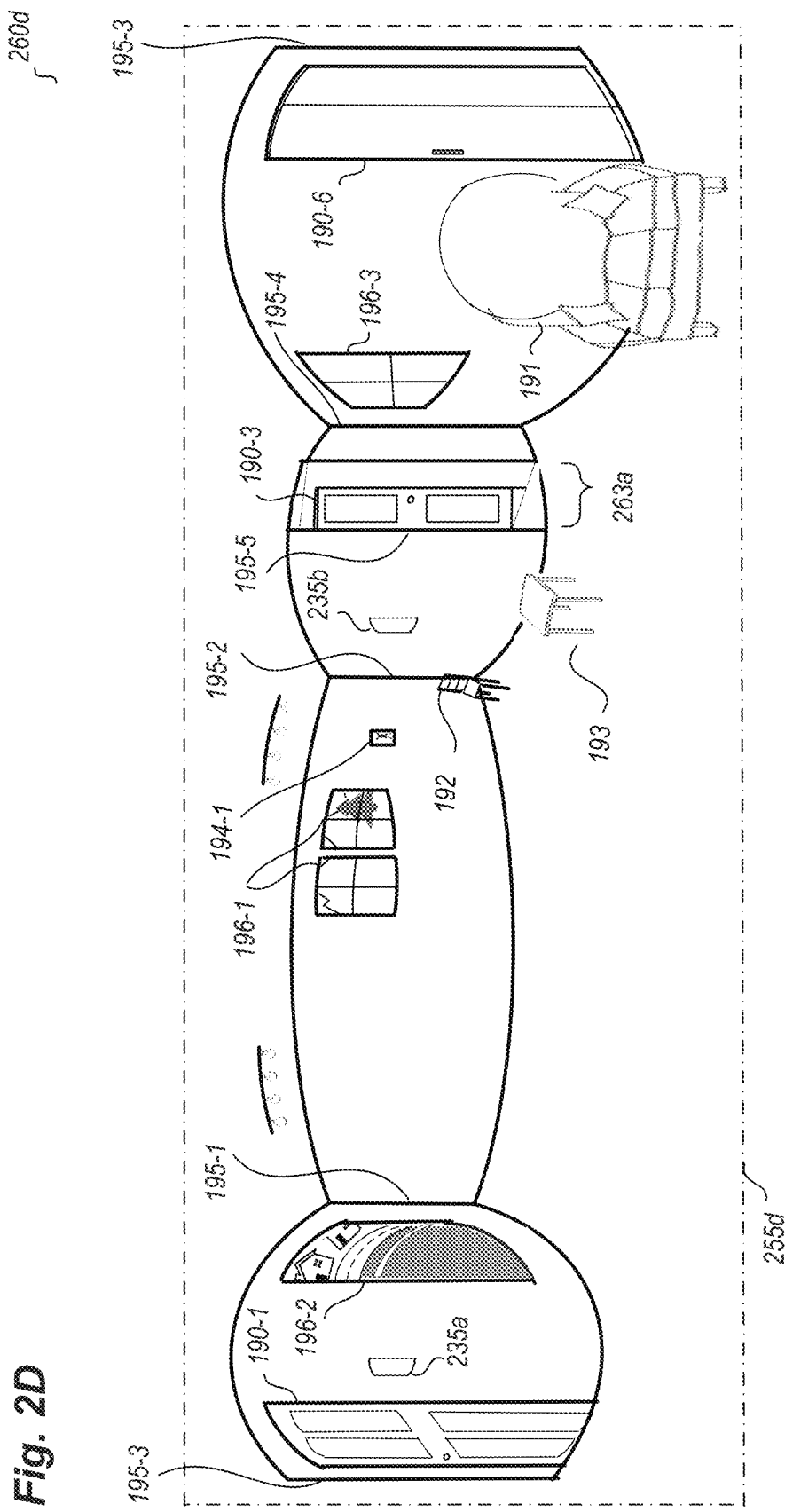

FIG. 2D continues the examples of FIGS. 2A-2C, and illustrates information 260d that includes a 360° panorama image 255d (e.g., taken from acquisition location 210B), which displays the entire living room in an equirectangular format—since the panorama image does not have a direction in the same manner as the perspective images of FIGS. 2A-2C, the directional indicator 109 is not displayed in FIG. 2D, although pose information for the panorama image may include one or more associated directions (e.g., a starting and/or ending direction for the panorama image, such as if acquired via rotation). A portion of the visual data of panorama image 255d corresponds to the first perspective image 250a (shown in approximately the center portion of the image 250d), while the left portion of the image 255d and the far-right portion of the image 255d contain visual data corresponding to those of the perspective images 250b and 250c-thus, for example, starting from image 255d, various perspective images may be rendered that include some or all of images 250a-250c (and optionally a large quantity of other images). This example panorama image 255d includes windows 196-1, 196-2 and 196-3, furniture 191-193, doorways 190-1 and 190-6, and non-doorway wall opening 263a to the hallway room (with the opening showing part of a doorway 190-3 visible in the adjacent hallway). Image 255d further illustrates a variety of room borders in a manner similar to that of the perspective images, but with the horizontal borders being displayed in an increasingly curved manner the farther they are from a horizontal midline of the image—the visible borders include vertical inter-wall borders 195-1 through 195-4, vertical border 195-5 at the north/left side of the hallway opening, vertical borders at the south/right side of the hallway opening, and horizontal borders between the walls and the floor and between the walls and the ceiling.

Figure 2E:
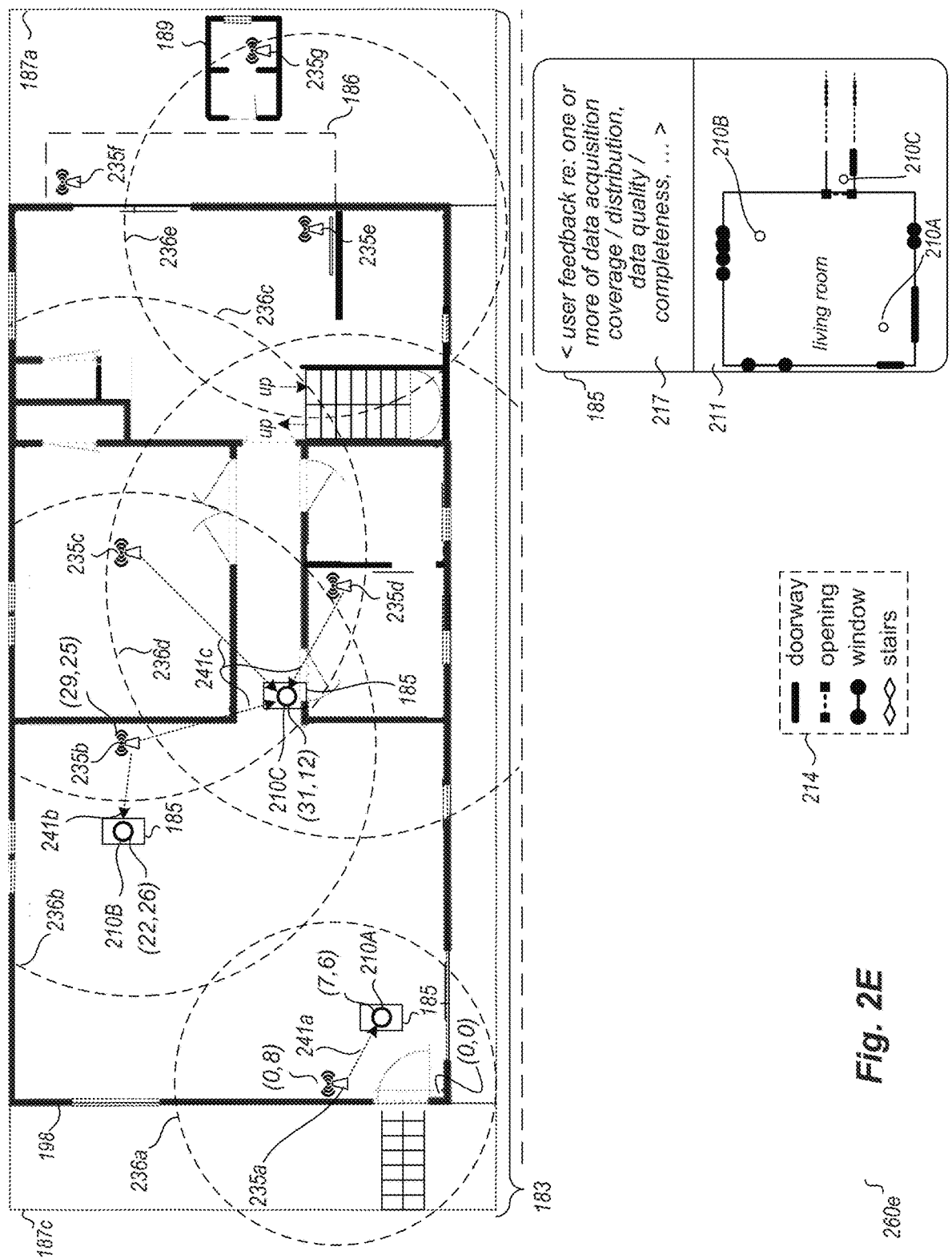

FIG. 2E illustrates information 260e corresponding to examples of automated operations of the BALDPM system to determine the positions of acquisition locations of images or other groups of data that are acquired at a building based at least in part on using one or more beacon transmitter devices or other wireless transmitter devices at the building. In particular, FIG. 2E illustrates a partial floor plan of the first story of building 198 on property 183 of FIG. 1, with seven example wireless transmitter devices 235a-235g being shown—in this example, they include wireless transmitters 235a and 235b in the living room, wireless transmitter 235c in the northern bedroom, wireless transmitter 235d in the southern bedroom, wireless transmitter 235e in the kitchen/dining room area, wireless transmitter 235f outside of the building 198 on a patio or deck 186, and wireless transmitter 235g outside of the building 198 in an outbuilding 189. It will be appreciated that the locations and quantities of wireless transmitters are provided for the sake of illustration, and that the invention is not limited to such details. In this example, each wireless transmitter device has a respective wireless transmission range 236 as shown, within which other devices with wireless receivers may receive transmissions from that wireless transmitter device.

In particular, at example acquisition location 210A, the image acquisition device 185 that acquires an image at that acquisition location is within the range 236a of wireless transmitter device 235a, and receives one or more wireless transmissions 241a at that acquisition location from that transmitter device. In this example, the image acquisition device 185 has computing capabilities in addition to image acquisition capabilities (e.g., is a smartphone device), and determines both distance and direction between the wireless transmitter device 235a and the acquisition location 210A, with that information combined with a known location of the wireless transmitter device 235a (shown in this example as relative coordinates of (0,8), corresponding to the southwest corner of the house 198 at coordinates (0,0), and using feet as a measure of distance) to determine the position of the acquisition location 210A (e.g., (7,6) in the same relative common coordinate system used for the wireless transmitter devices). In a similar manner, the image acquisition device 185 at acquisition location 210B is in the range 236b of wireless transmitter device 235b, and receives and uses one or more wireless transmissions 241b from the wireless transmitter device 235b to determine distance and direction between the acquisition location 210B and the wireless transmitter device 235b, and to combine that information with a known location (e.g., (29,25) in the common coordinate system) of the wireless transmitter device 235b to determine a position of the acquisition location 210B (e.g., in the same relative common coordinate system used for the wireless transmitter devices).

At acquisition location 210C, the image acquisition device 185 is within the range of three wireless transmitter devices, including range 236b of wireless transmitter device 235b, range 236c of wireless transmitter device 235c, and range 236d of wireless transmitter device 235d, and receives one or more wireless transmissions 241c from each of those wireless transmitter devices. In such a situation, even if the device 185 is able to determine only a distance to each of the three wireless transmitter devices, that distance information may be combined with known locations of the three wireless transmitter devices to determine the position of acquisition location 210C (e.g., using triangulation, and in the same relative common coordinate system used for the wireless transmitter devices, such as at (31,12) in the common coordinate system). Similar determinations of positions may be performed for other acquisition locations. In addition, it will be noted that an external acquisition location such as acquisition locations 210N-210P may in some situations receive wireless transmissions only from one or more wireless transmitter devices located inside of the building 198, while other internal and/or external acquisition locations may receive wireless transmissions from one or more external wireless transmitter devices such as devices 235f and 235g.

FIG. 2E also illustrates an example of information that may be displayed on a screen of the image acquisition device 185 (or on another device, such as a companion computing device to a camera device or other acquisition device that does not have such display and/or computing capabilities). In this example, as the images are acquired at acquisition locations 210A-210C, a partial floor plan for the building 198 is concurrently generated, with an example of the partial floor plan shown in information 211 on part of a screen of the image acquisition device 185 (e.g., in a GUI displayed on the device 185)—in this example, the partial floor plan displays locations of structural elements such as doorways, non-doorway wall openings, windows, stairs, etc. using a legend 214, which may also be displayed on the device 185 (not shown in this example) or otherwise available to the user of the device. This partial floor plan provides feedback to the user of the device 185 regarding parts of the building 198 that have not yet been represented in the partial floor plan, such as to illustrate areas in and around the building at which to acquire additional images. The example information displayed on the device 185 may further include additional feedback of one or more types as shown in an area 217, whether in addition to or instead of the information 211, such as information about quality and/or completeness of images and/or other data that has been acquired, other information about coverage and/or distribution of the data that has been acquired, etc.

Figure 2F:
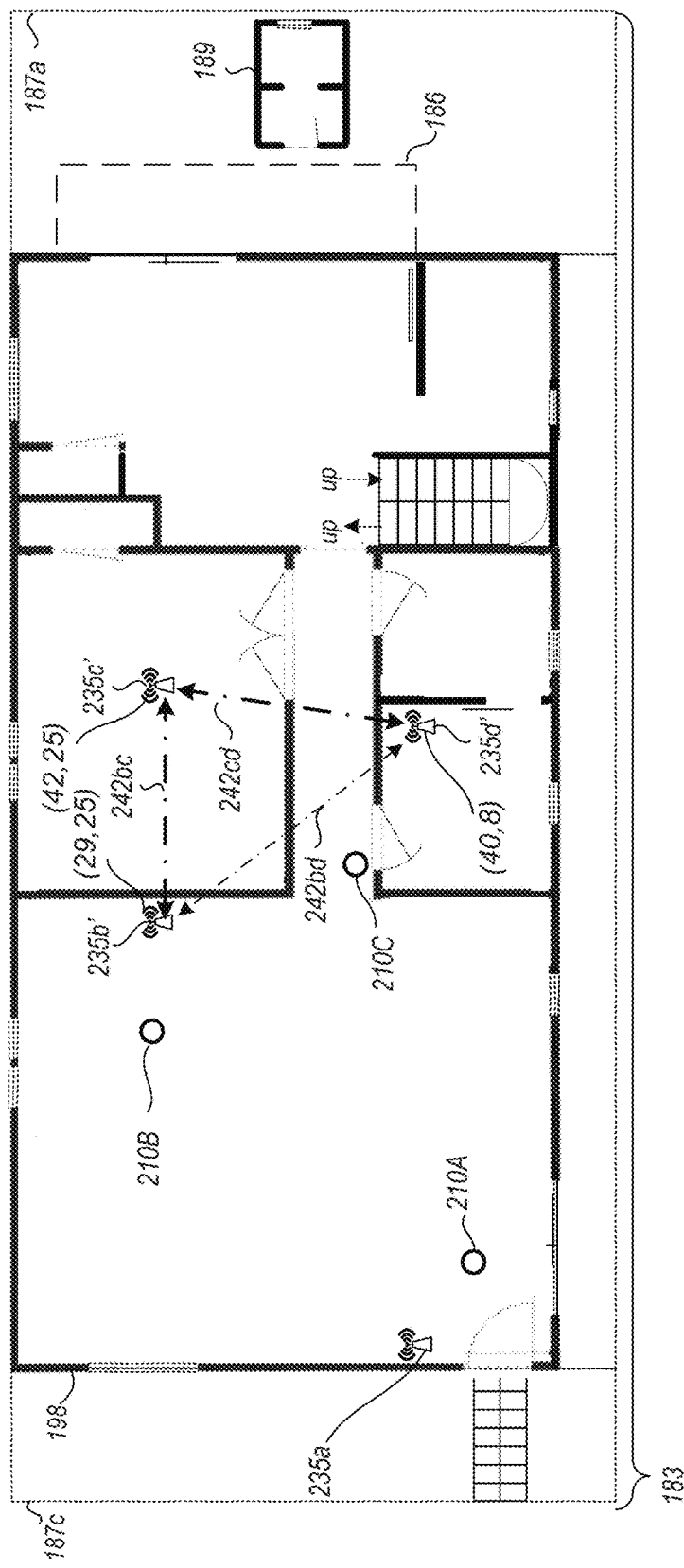

FIG. 2F continues the examples of FIG. 2E, and illustrates information 260*f* related to how at least some of the wireless transmitter devices may form a mesh network that may be used to determine relative locations of the wireless transmitter devices in the mesh network. In this example, the wireless transmitter devices 235*b*, 235*c* and 235*d* further include wireless receivers (as reflected by the modified designations 235*b'*, 235*c'* and 235*d'* for those wireless transmitter/receiver devices), and may exchange wireless transmissions between each other. In a manner similar to that of the image acquisition device 185, each wireless transmitter/receiver device (or one or more other computing devices, not shown, such as part of a smart home server) may determine at least distance and optionally direction to each of the other wireless transmitter/receiver devices in the mesh network, and use triangulation or other location methodologies to determine the respective relative locations of those wireless transmitter/receiver devices. In addition, in at least some embodiments and situations, wireless transmitter devices and/or wireless receiver devices may automatically or semi-automatically self-calibrate beacon parameter data (e.g., to map its signal to distance) and/or location in various manners, with non-exclusive examples discussed in Shchekotov et al., "Semi-Automatic Self-Calibrating Indoor Localization Using BLE Beacon Multilateration", Proceedings Of The 23$^{rd}$ Conference Of Open Innovations Association (FRUCT), 2018 (ISSN 2305-7254); and in Shchekotov et al., "The Ontology Driven SLAM Based Indoor Localization Technique", Journal Of Physics: Conference Series 1801 012007, 2021; each of which is incorporated herein by reference in its entirety.

FIG. 2G continues the examples of FIGS. 2E-2F, and illustrates information 260*g* that illustrates an alternative technique for determining relative positions of two or more wireless transmitter devices based at least in part on visual data of one or more images. In this example, an image acquisition device 185 and/or 184 is shown at a position in the north central part of the living room, and acquires a panorama image 255*g* from that position (e.g., by rotating in a circle of 360° that begins and ends in a westward direction with a field of view 243). This panorama image has visual data of both the wireless transmitter devices 235*a* and 235*b* in the living room, and analysis of the visual data of the panorama image may identify those wireless transmitter devices as well as various other features 227 in the room as shown in information 256*g*, and use that visual data to determine at least a direction 242*ab* between the two wireless transmitter devices. While not shown in this example, visual data from multiple such images acquired in a living room may be further combined, optionally along with information about known sizes or distances, to determine both distance and direction between the two wireless transmitter devices and corresponding relative locations of those wireless transmitter devices. Furthermore, such information may be combined with relative location information from a partial mesh network as discussed with respect to FIG. 2F to include all of the wireless transmitter devices 235*a*-235*d* in a common relative coordinate system, with some or all of the other wireless transmitter devices 235 at the building similarly included in the mesh network or otherwise having determined respective locations. It will be appreciated that, while the example wireless transmitter devices are illustrated in FIG. 2G as being on walls of the room, that wireless transmitter devices and/or wireless receiver devices may be installed or otherwise placed at various positions in or around a building, including on floors or ceilings, on top of or otherwise attached to other objects, inside walls, etc.

FIG. 2G further illustrates that additional location information may be used when determining the position of an acquisition location and/or the location of a wireless transmitter device. In particular, the image acquisition device 185 and/or 184 may in this example receive GPS signals 223 for at least some locations, such as while outside the building 198 and near the entrance, and optionally at some or all locations inside the building 198—even if the locations inside the building do not receive the GPS signals 223, a known absolute coordinate of the image acquisition device at the entrance of the building 198 may be combined with movement data of the device inside the building (e.g., using inertial navigation) to determine at least approximate location data for the device 185 inside the building 198, which may be combined with position determination activities based at least in part on transmissions from wireless transmitter devices as part of determining the position of an acquisition location and/or the location of a wireless transmitter device. As one non-exclusive example, if the image acquisition device at acquisition location 210A in FIG. 2E is able to determine only direction information between that acquisition location and the wireless transmitter device 235*a*, such additional GPS-based location information may be combined with the direction information as part of determining a position of the acquisition location in the building. In addition, whether in addition to or instead of such GPS-based location information, the image acquisition device may perform analysis of visual data of images to determine location information for the device inside the building, such as using visual odometry (e.g., in a manner similar to that discussed with respect to information 256*g* but to combine information from multiple images) and/or further analysis using IMU-based data (e.g., SLAM, SfM, etc.). The image acquisition device 185 may further be exchanging communications with an embodiment of the BALDPM system (e.g., periodically, continuously, etc.), such as with a remote copy of the BALDPM system over one or more networks 199, and the image acquisition device 185 and/or the BALDPM system may similarly be exchanging information over one or more networks 199 with one or more other devices 105.

Figure 2H:
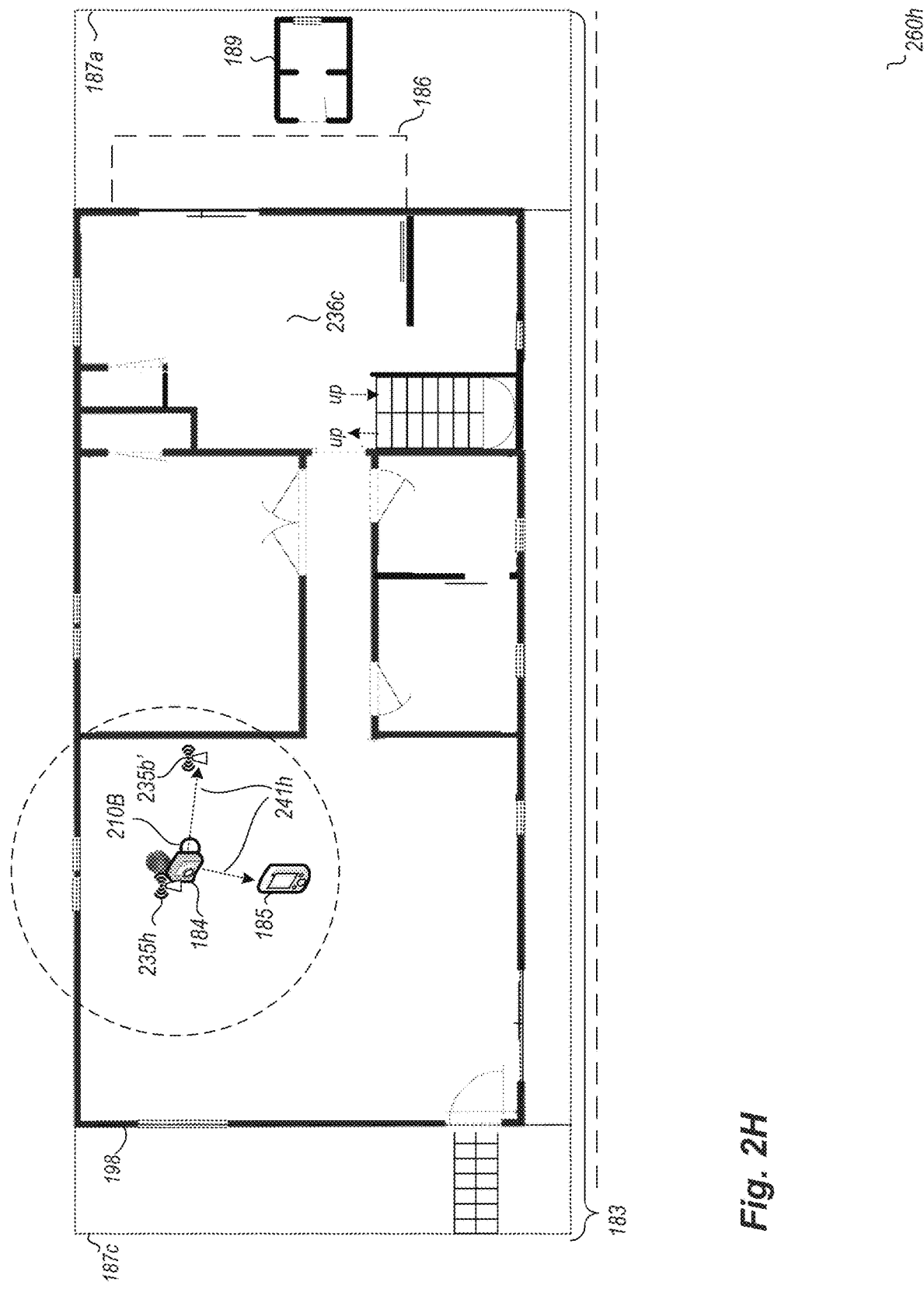

FIG. 2H continues the examples of FIGS. 2E-2G, and illustrates information 260*h* showing an alternative embodiment in which a camera device 184 is used to acquire one or more images at one or more of the acquisition locations, such as at acquisition location 210B in this example. In this example embodiment, the camera device 184 does not have a built-in wireless receiver, but instead is associated with an additional wireless transmitter device 235*h* (e.g., mounted on or otherwise attached to the camera device), which has a range of 236h in which the wireless transmitter device is transmitting data. In this example embodiment, such wireless transmissions from the wireless transmitter device 235h may be received by one or more wireless receivers, such as wireless transmitter/receiver device 235b' that is installed or otherwise placed in the building and/or mobile companion device 185. In a manner similar to that described previously with respect to FIG. 2E, one or more computing devices (e.g., device 185, wireless transmitter device 235b', one or more other computing systems, etc.) may use the transmitted data from the wireless transmitter device 235h to determine at least distance and optionally direction between the acquisition location 210B and those one or more wireless receivers, and combine that information with the known location of wireless transmitter/receiver device 235b' and/or a determined location of the mobile device 185 to determine the position of the acquisition location 210B.

Figure 2I:
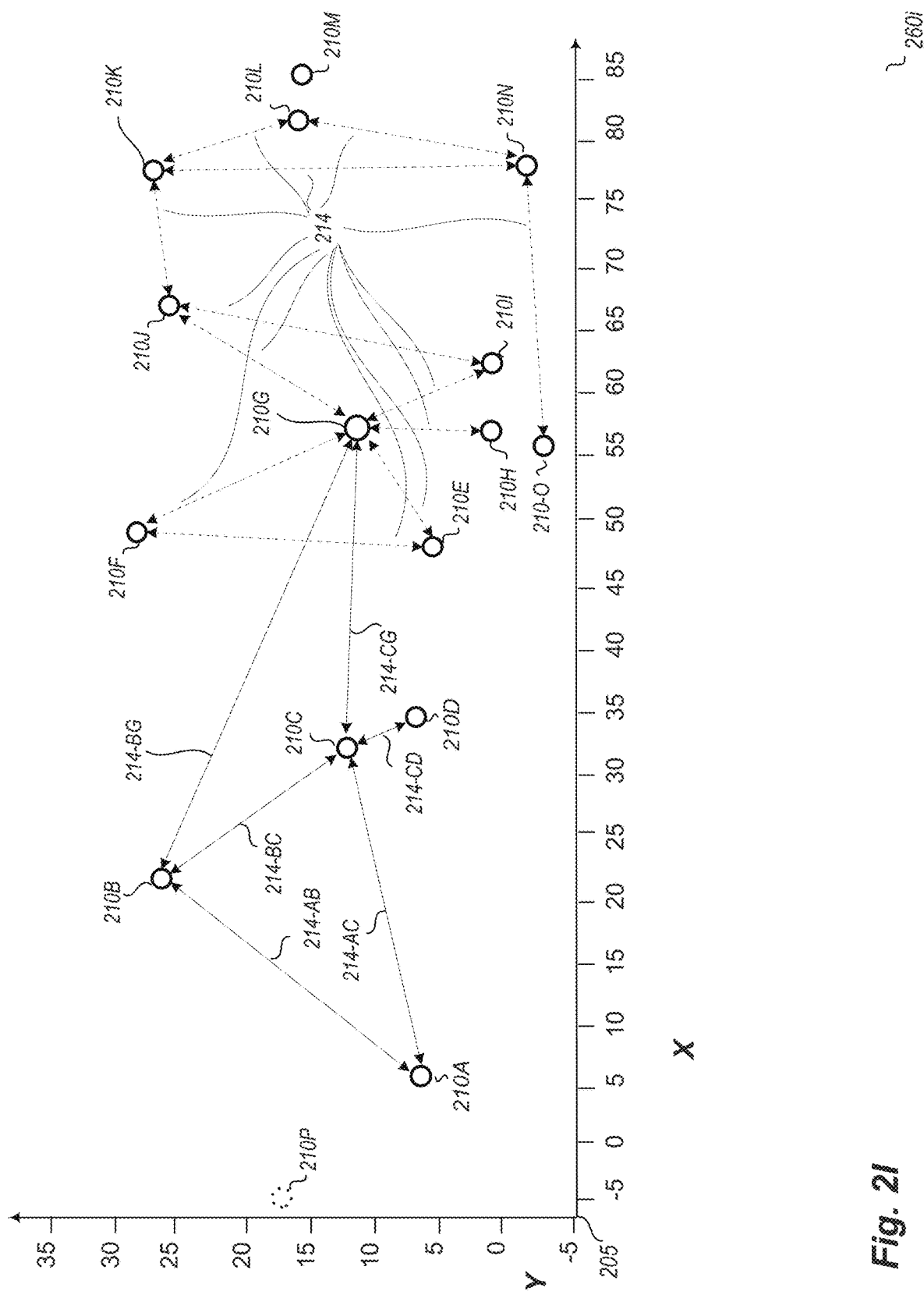

FIG. 2I continues the examples of FIGS. 2A-2H, and further illustrates information 260i that includes information resulting from determining at least relative positions of acquisition locations 210A to 210-O, including links 214 illustrating directions between some pairs of acquisition locations. Additional details corresponding to example embodiments of generating such position information are included in U.S. Provisional Patent Application No. 63/272,854, filed Oct. 28, 2021 and entitled "Automated Building Floor Plan Generation Using Visual Data Of Multiple Building Images"; which is incorporated herein by reference in its entirety.

Figure 2J:
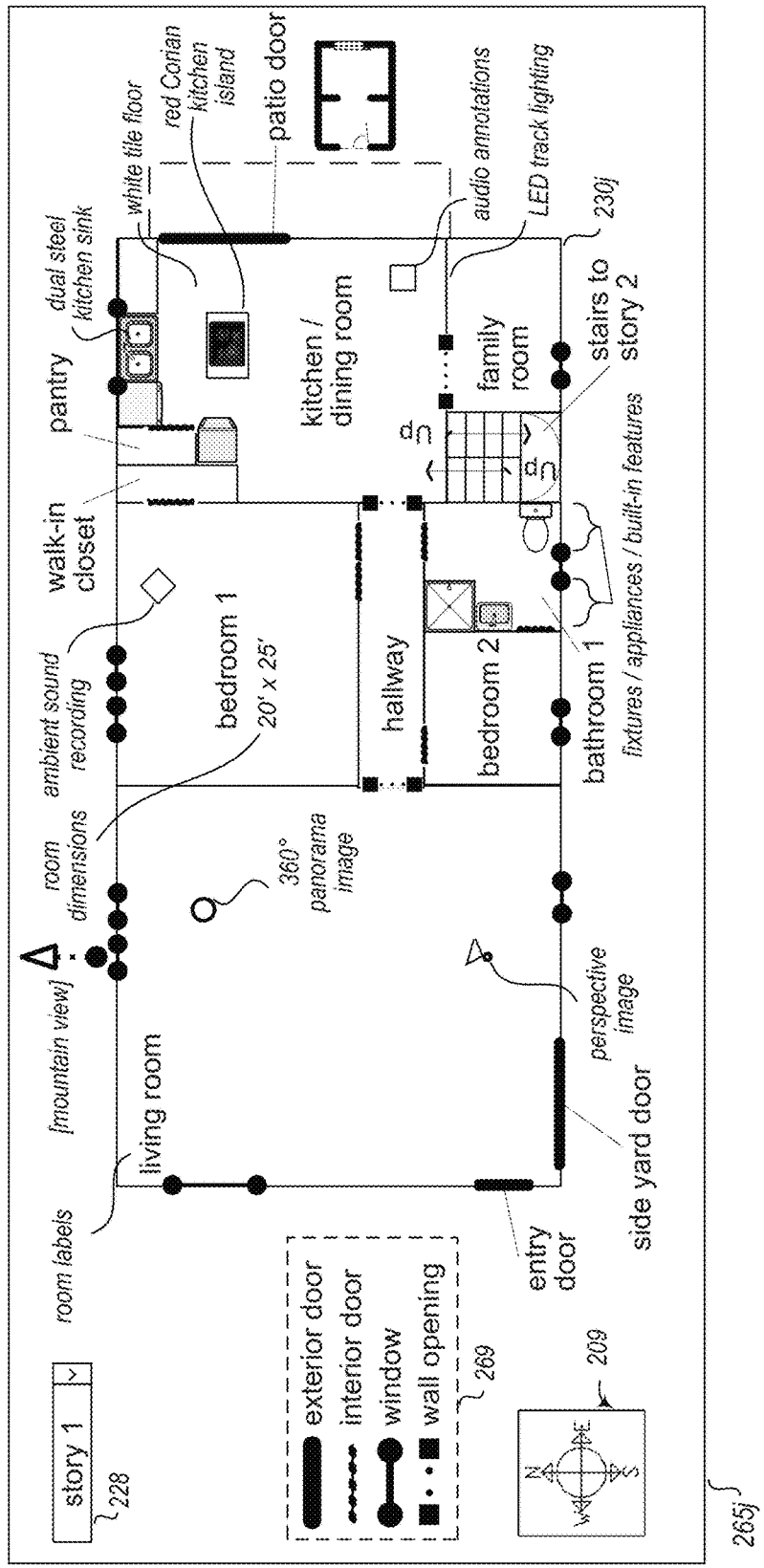

FIG. 2J continues the examples of FIGS. 2A-2I, and illustrates information 260j that includes one example of part of a 2D floor plan 230j for the house 198 (e.g., corresponding to a first or main story of the house) presented to an end-user in a GUI 265j, such as may be generated by the MIGM system via analysis of images and optionally other data acquired in the house and may be displayed by the MIGM system and/or the BALDPM system, and with the living room being the most westward room of the house (as reflected by directional indicator 209)—it will be appreciated that a 3D or 2.5D floor plan with rendered wall height information may be similarly generated and displayed in some embodiments, whether in addition to or instead of such a 2D floor plan. Various types of information are illustrated on the 2D floor plan 230j in this example. For example, such types of information may include one or more of the following: room labels added to some or all rooms (e.g., "living room" for the living room); room dimensions added for some or all rooms; visual indications of objects such as installed fixtures or appliances (e.g., kitchen appliances, bathroom items, etc.) or other built-in elements (e.g., a kitchen island) added for some or all rooms, optionally with associated labels and/or descriptive annotations (e.g., dual steel kitchen sink, kitchen island with red Corian surface, LED track lighting, white tile floor, etc.); visual indications added for some or all rooms of positions of additional types of associated and linked information (e.g., of other panorama images and/or perspective images that an end-user may select for further display; of audio or non-audio annotations that an end-user may select for further presentation, such as "the kitchen includes a Brand X refrigerator with features Y, a built-in stove/oven of Brand Z, etc."; of sound recordings that an end-user may select for further presentation, such as to hear the level of street noise from bedroom 1; etc.); visual indications added for some or all rooms of structural elements such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI such as GUI 265j, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2D). In addition, in this example a user-selectable control 228 is added to indicate a current story that is displayed for the floor plan, and to allow the end-user to select a different story to be displayed—in some embodiments, a change in stories or other levels may be made directly from the floor plan, whether in addition to or instead of using the control 228, and such as via selection of a corresponding connecting passage in the illustrated floor plan (e.g., the stairs to a second or upper story, to a basement, etc.). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or VTFM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

Figure 2K:
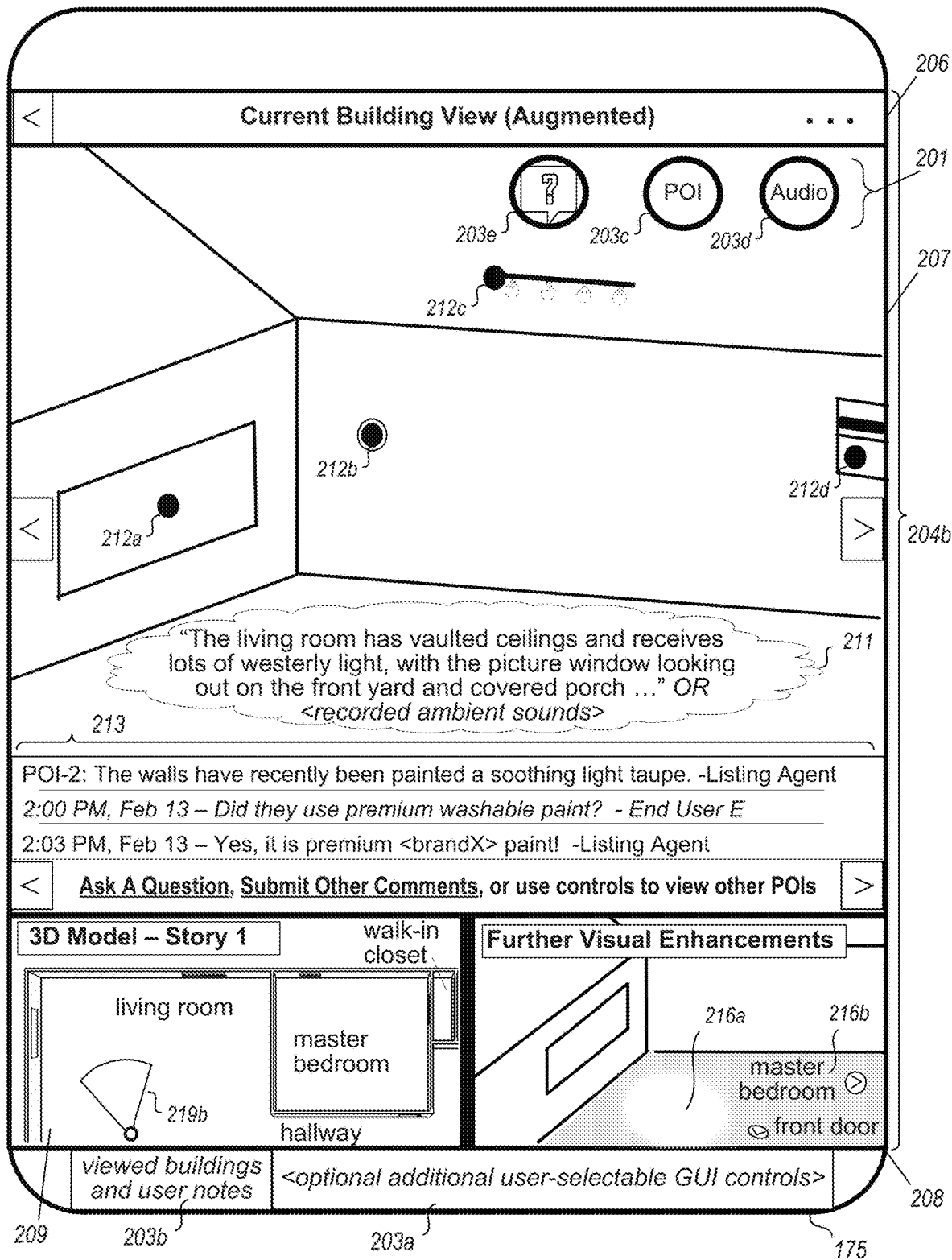

FIG. 2K continues the examples of FIGS. 2A-2J, and illustrates information 260k that provides an example of one type of GUI of a client application on user device 175 to provide building information to user device 175 about building 198. In this example, the GUI illustrates multiple types of information 204b in a primary pane 207 and two secondary panes 208 and 209, with each of the panes showing information of a different type about the same area of the example house 198, although other GUIs may include more or less panes and/or display different types of information. The primary pane 207 in this example is showing a target image acquired by the mobile device in the living room, with the direction of the image being in the northwest direction, and also includes a header 206 that provides a description of the type of content shown (here, the target image with the mobile device's current camera view of the building as augmented with overlaid visual data enhancements), although in other embodiments such a header may not be used. The primary pane 207 may also have one or more user-selectable GUI controls that enable the end-user (not shown) to modify information being displayed in the GUI, such as user-selectable controls 201c-201e overlaid on the primary pane (including a toggle control 203c to show or hide information about object/attribute points of interest that are present in the current image, a toggle control 203d to show or hide a description of the area of the house shown by the image, a toggle control 203e to show or hide information about questions and answers corresponding to the area of the house shown in the image and to optionally allow the end-user to supply one or more additional questions or answers, etc.) and optionally additional user-selectable GUI controls 201, 203a and 203b may be shown separate from the primary pane 207—in at least some embodiments and situations, at least some of the displayed user-selectable controls may be contextual based on the content currently shown in the primary pane (in this example, associated with image content, and optionally with the current room being displayed).

In this example, various information has been overlaid on the primary pane 207 using visual data enhancements, such as based on selection by the end-user of the user-selectable controls 203c, 203d and 203e in this example, although it will be appreciated that the end-user may instead select zero, one, or two of those three controls in other situations. Selection of the user-selectable control 203c in this example has caused several additional user-selectable visual indicator GUI controls 212 associated with points of interest in the room to be illustrated, with visual indicator 212b being currently selected and having a corresponding textual comment shown in the area 213 of the primary pane (to comment about paint on the walls of the room). Other visual POI indicators in this example include 212a on the west-facing picture window, 212d on the north-facing window, and 212c on the overhead track lighting fixture on the ceiling. While the selected visual indicator 212b has associated text that is displayed in this example, other visual indicators for POIs may have other types of information associated, such as if the window visual indicators 212a and/or 212d have images and/or video associated with them, such as to show images or videos looking out the window (e.g., a time-lapse video over a 24-hour period of the exterior of the house from a window or door, such as to show road traffic or people traffic outside over that time period). In addition to the activation of the control 203c, the user-selectable control 203d has also been activated to provide an audio description of the area shown in the image, with the visual indicator 211 shown in this example representing audio information that may be audibly presented in response to the selection of that control (e.g., recorded ambient sounds; an audio recitation of corresponding description information, such as instead of having a textual representation of the information as shown in this example, or instead in addition to the textual information, such as if a closed captioning option is further selected). Furthermore, the user-selectable control 203b corresponding to questions and answers is also selected, causing additional information in the area 213 to be shown, such as a question from another end-user and a corresponding answer, as well as further user-selectable controls to allow the end-user to ask a question to be answered, submit a comment for display to others, or to cycle through other existing questions and comments. It will be appreciated that illustrated types of information may be presented in other manners in other embodiments, or may not be shown.

In addition to the image shown in the primary pane, the secondary panes 208 and 209 show other types of content about the same location or area of the example house. In particular, the secondary pane 209 in this example shows a portion of a 3D computer model of the house, and in particular shows a portion of the computer model that includes the northwest corner of the living room, as well as optionally including some or all of other parts of the same floor—the computer model is overlaid in this example with the visual indicator 219b to illustrate where the image shown in the primary pane was acquired, and the 2D orientation of the camera that acquired the image, and other types of information may be similarly overlaid (e.g., directions or other guidance to a destination location, such as with a path and/or destination target location being overlaid on the visual representation of the model, etc.). In addition, the secondary pane 208 in this example shows an example of simulated daylight lighting 216a added to the image, and further shows visual indicators 216 to direct the user to other areas/POIs that are not currently visible (e.g., a different adjacent room, an object in another part of the current room that is not currently visible, etc.). While simulated lighting is illustrated in this example in secondary pane 208, a variety of types of information may be overlaid on the primary and/or secondary panes, such as when selected by corresponding user-selectable GUI controls (e.g., additional user-selectable GUI controls 203a), with non-exclusive examples of such overlaid information and additional functionality including the following: to show measurements or other scale information; to show simulated sunlight for specified conditions (e.g., one or more times of day and/or times of year); to show actual interior lighting (e.g., acquired in previous corresponding images), optionally under specified conditions; to show information about a surrounding environment of the building; to allow virtual objects and/or surfaces and/or structural changes to be shown (e.g., to change color, texture etc. of walls, floors, object surfaces, etc.); to present sound recordings from one or more locations of the building (e.g., of ambient sound at specified times); etc. In addition, other user-selectable GUI controls are further available in this example, including a control 203*b* by which a user may select information about previous visits to other buildings (e.g., from stored visit logs for the user and/or the user's device). It will be appreciated that the information discussed with respect to the examples of FIG. 2K are provided for illustrative purposes, and that the invention is not limited to such details.

Various details have been provided with respect to FIGS. 2A-2K and with respect to the non-exclusive example embodiment discussed above, but it will be appreciated that the provided details are non-exclusive examples included for illustrative purposes, and other embodiments may be performed in other manners without some or all such details.

Figure 3:
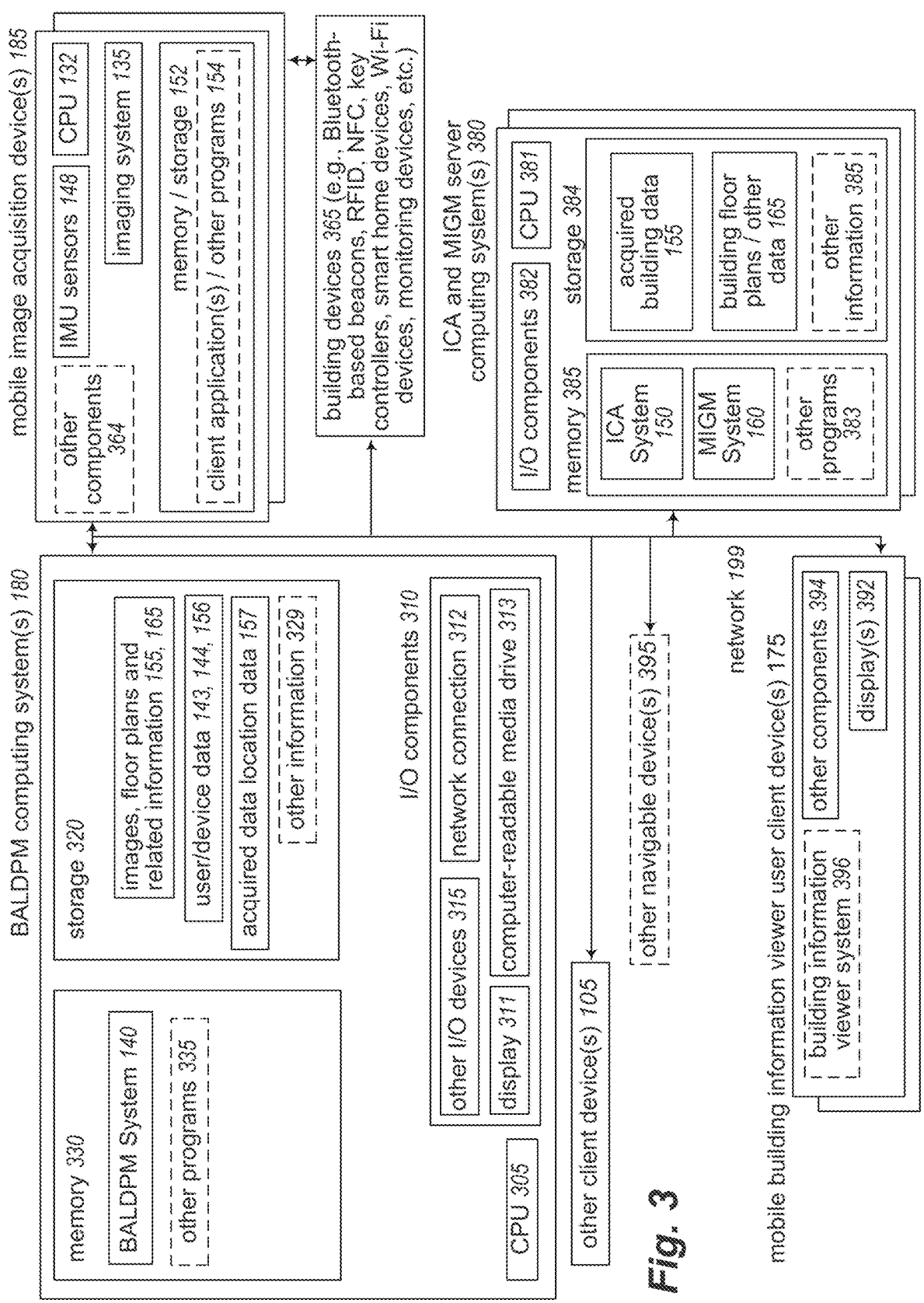
FIG. 3 is a block diagram illustrating a computing system suitable for executing an embodiment of a system that performs at least some of the techniques described in the present disclosure.

FIG. 3 is a block diagram illustrating an embodiment of one or more computing systems 180 executing an implementation of a BALDPM system 140 (e.g., in a manner analogous to that of FIG. 1), and one or more server computing systems 380 executing an implementation of an ICA system 150 and an MIGM system 160—the computing system(s) 180 and BALDPM system, and/or computing system(s) 380 and/or ICA and MIGM systems, may be implemented using a plurality of hardware components that form electronic circuits suitable for and configured to, when in combined operation, perform at least some of the techniques described herein. Image acquisition devices 185 may each be executing one or more client applications and/or other programs 154, and one or more other computing systems and devices may optionally be executing a BALDPM system client application and/or other building information viewer system 396 (such as each mobile device 175) and/or optional other programs 335 and 383 (such as server computing system(s) 180 and 380, respectively, in this example). In the illustrated embodiment, each server computing system 180 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 385, storage 384 and I/O components 382 are illustrated in this example for the sake of brevity.

The server computing system(s) 180 and executing BALDPM system 140, and server computing system(s) 380 and executing ICA and MIGM systems 150 and 160, and acquisition devices 185 and executing software 154, and mobile devices 175 and executing software 396 may communicate with each other and with other computing systems and devices in this illustrated embodiment, such as via one or more networks 199 (e.g., the Internet, one or more cellular telephone networks, etc.), including to interact with optional other navigable devices 395 that receive and use floor plans and optionally other generated information for navigation purposes (e.g., for use by semi-autonomous or fully autonomous vehicles or other devices), and for acquisition devices 185 to communicate with building devices 365 (e.g., using communication and/or sensor components to receive transmissions from transmitter devices and/or to otherwise communicate with other building devices, such as electronic lockboxes or locks, smart home devices, etc.). The mobile devices 175 in this example embodiment are illustrated as including one or more displays 392 on which to present provide building information from the BALDPM system, optionally other components 394 (e.g., computing resources, I/O components, sensors, etc.). In other embodiments, some of the described functionality may be combined in less computing systems, such as to combine some or all of the BALDPM system 140 with a building information viewer system 396 in a single system or device (e.g., a mobile device 175), to combine the BALDPM system 140 and the image acquisition functionality of device(s) 185 in a single system or device, to combine the ICA and MIGM systems 150 and 160 and the image acquisition functionality of device(s) 185 in a single system or device, to combine the BALDPM system 140 and one or both of the ICA and MIGM systems 150 and 160 in a single system or device, to combine the BALDPM system 140 and the ICA and MIGM systems 150 and 160 and the image acquisition functionality of device(s) 185 in a single system or device, etc.

In the illustrated embodiment, an embodiment of the BALDPM system 140 executes in memory 330 of the server computing system(s) 180 in order to perform at least some of the described techniques, such as by using the processor(s) 305 to execute software instructions of the system 140 in a manner that configures the processor(s) 305 and computing system 180 to perform automated operations that implement those described techniques. The illustrated embodiment of the BALDPM system may include one or more components (not shown), such as to each perform portions of the functionality of the BALDPM system, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 150 and 160 on the server computing system(s) 380, and/or a copy of a building information viewer system may execute as one of the other programs 335 (e.g., if the computing system(s) 180 are the same as a mobile device 175). The BALDPM system 140 may further, during its operation, store and/or retrieve various types of data on storage 320 (e.g., in one or more databases or other data structures), such as various types of user/device data 143 and/or 144 and/or 156, images and floor plans and other associated information 155 and/or 165 (e.g., generated and saved 2.5D and/or 3D models, building and room dimensions for use with associated floor plans, additional images and/or annotation information, etc.), determined position data 157 for data acquired at building acquisition locations, and/or various types of optional other information 329 (e.g., various analytical information related to presentation or other use of one or more building interiors or other environments).

In addition, embodiments of the ICA and MIGM systems 150 and 160 execute in memory 385 of the server computing system(s) 380 in the illustrated embodiment in order to perform techniques related to generating panorama images and floor plans for buildings, such as by using the processor(s) 381 to execute software instructions of the systems 150 and/or 160 in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 150 and 160 may further, during operation, store and/or retrieve various types of data on storage 384 (e.g., in one or more databases or other data structures), such as video and/or image information 155 acquired for one or more buildings (e.g., 360° video or images for analysis to generate floor plans, to provide to users of client computing devices 370 for display, etc.), floor plans and/or other generated mapping information 165, and optionally other information 385 (e.g., additional images and/or annotation information for use with associated floor plans, building and room dimensions for use with associated floor plans, various analytical information related to presentation or other use of one or more building interiors or other environments, etc.)—while not illustrated in FIG. 3, the ICA and/or MIGM systems may further store and use additional types of information, such as about other types of building information to be analyzed and/or provided to the BALDPM system, about ICA and/or MIGM system operator users and/or end-users, etc.

Some or all of the mobile devices 175, mobile image acquisition devices 185, optional other navigable devices 395, other client devices 105 and other computing systems (not shown) may similarly include some or all of the same types of components illustrated for server computing system 180. As one non-limiting example, the mobile image acquisition devices 185 are each shown to include one or more hardware CPU(s) 132, memory and/or storage 152, one or more imaging systems 135, IMU hardware sensors 148 (e.g., for use in acquisition of video and/or images, associated device movement data, etc.), and other components 364. In the illustrated example, zero or one or more client applications 154 (e.g., an application specific to the ICA system and/or to the MIGM system and/or to the BALDPM system) and/or other programs 154 are executing in memory 152, such as to participate in communication with the BALDPM system 140, ICA system 150, MIGM system 160 and/or other computing systems. While particular components are not illustrated for the other navigable devices 395 or other computing devices/systems 105, it will be appreciated that they may include similar and/or additional components.

It will also be appreciated that computing systems 180 and 185 and 380 and 175 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smartphones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BALDPM system 140 may in some embodiments be distributed in various components, some of the described functionality of the BALDPM system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BALDPM system 140 executing on server computing systems 180, by a BALDPM client application or other building information viewer system executing on mobile devices 175 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
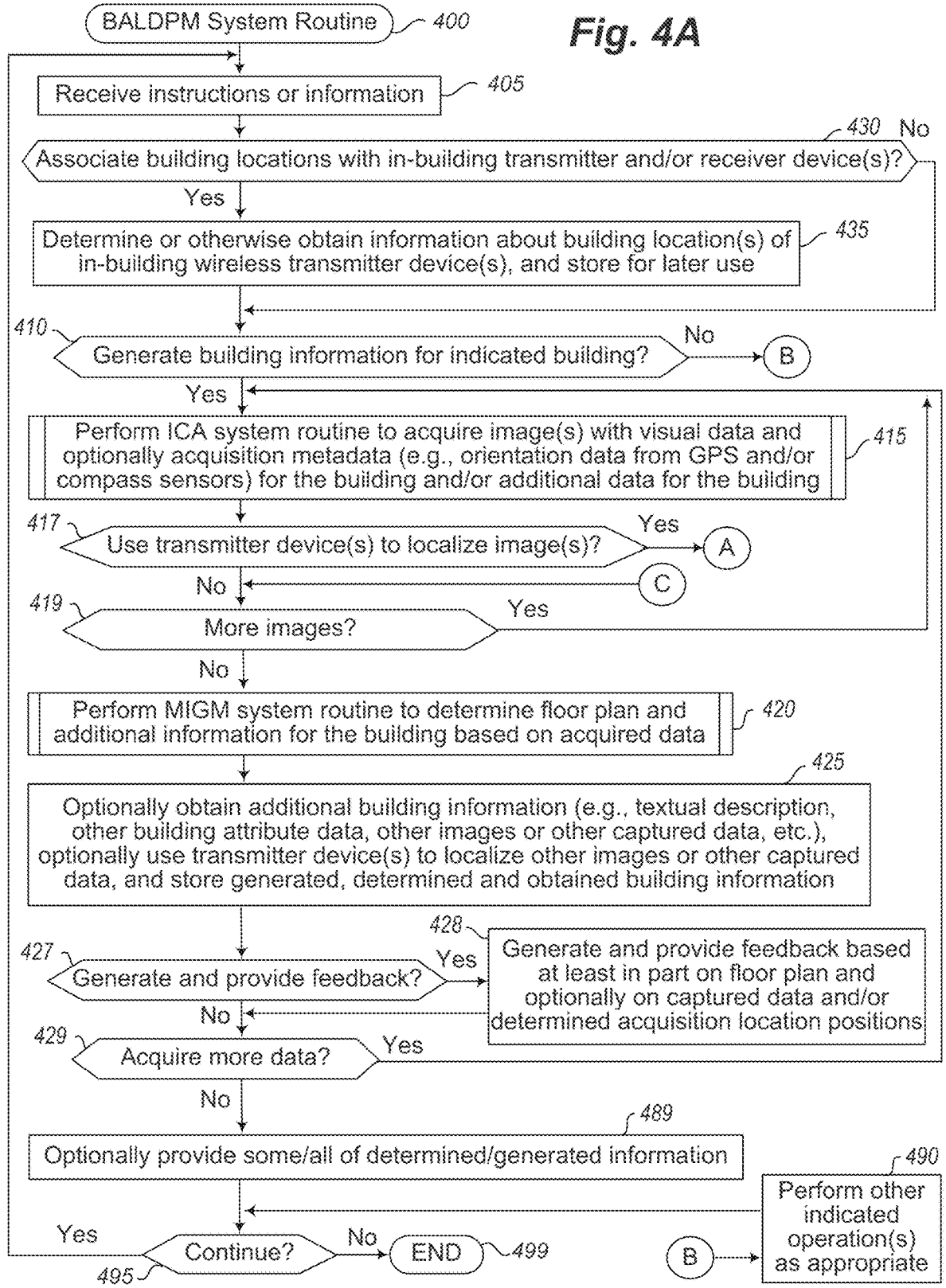

FIGS. 4A-4B illustrate an example embodiment of a flow diagram for a Building Acquisition Location Determination and Presentation Manager (BALDPM) system routine in accordance with an embodiment of the present disclosure. The routine may be performed by, for example, execution of the BALDPM system 140 of FIGS. 1 and/or 3, and/or a BALDPM system as described with respect to FIGS. 2E-2K and elsewhere herein, such as to perform automated operations related to using one or more beacon transmitter devices or other wireless transmitter devices at a building as part of determining the acquisition locations of images or other groups of data that are acquired at the building, and for subsequently using the acquired data and determined acquisition location information in one or more further automated manners. In the example embodiment of FIGS. 4A-4B, the indicated buildings may be houses or other types of buildings, and various types of information may be provided or otherwise used in particular manners, but in other embodiments, other types of buildings and information uses may be provided and used, as discussed elsewhere herein.

The illustrated embodiment of the routine begins at block 405, where instructions or information are received. The routine continues to block 430, where it determines if the instructions or other information received in block 405 indicate to associate building location information with one or more transmitter devices and/or one or more receiver devices at a building, and if so continues to block 435, where it determines or otherwise obtains information about locations at a building of one or more such transmitter devices and/or receiver devices, and stores them for later use. As discussed in greater detail elsewhere herein, such building location information may be automatically determined in various manners, including based on a mesh network of multiple such devices with associated transmitter and receiver capabilities.

After block 435, or if it is instead determined in block 430 that the instructions or other information received in block 405 are not to associate building locations with devices, the routine continues to block 410, where it determines if the instructions or information received in block 405 are to generate building information for use with an indicated building, and if not continues to block 490. Otherwise, the routine continues to block 415 to perform the ICA system routine to acquire one or more images with visual data and optionally acquisition metadata (e.g., orientation data and other pose data) for the building and/or other data for the building, and to receive the results from the routine—one example of such an ICA system routine is discussed further with respect to FIG. 5. After block 415, the routine continues to block 417 to determine whether to use received transmissions from one or more transmitter devices to localize the one or more images by determining the positions of the acquisition locations for the image(s), and if so continues to block 437. In block 437, the routine retrieves building location information for one or more transmitter devices and/or receiver devices at the building (e.g., as specified in block 435), and in block 440 receives information about one or more images or other groups of data acquired at one or more building acquisition locations. In block 445, the routine selects the next acquisition location as a current acquisition location, beginning with the first, and continues to block 450 to determine if the wireless transmissions received at the current acquisition location (e.g., by a data acquisition device at that acquisition location) are from a single building transmitter device and are able to be used to provide distance and orientation information between the current acquisition location and that transmitter device. If so, the routine continues to block 452, where it obtains the transmitted data received at the current acquisition location, determines the position at the building of the acquisition location using information about the building location of that transmitter device and the distance and orientation data determined from the transmitter device data, and associates the determined position for the acquisition location with one or more images and/or other groups of data acquired that acquisition location.

After block 452, or if it is instead determined in block 450 that the received transmitter data is not from a single building transmitter device that is able to be used to provide both distance and orientation data, the routine continues to block 455 to determine whether the wireless transmitter data received at the current acquisition location (e.g., by a data acquisition device at that acquisition location) is from multiple building transmitter devices and is able to be used to provide at least distance data between the current acquisition location and those transmitter devices. If so, the routine continues to block 457, where it obtains the transmitted data received at the current acquisition location, determines the position at the building of the acquisition location using information about the building locations of those transmitter devices and at least the distance data determined from the transmitter device data (e.g., using triangulation) and optionally direction data if available, and associates the determined position for the acquisition location with one or more images and/or other groups of data acquired at that acquisition location.

After block 457, or if it is instead determined in block 455 that transmissions from multiple building transmitter devices are not received at the current acquisition location, the routine continues to block 460 to determine whether the data acquisition device is associated with a transmitter device at the acquisition location (e.g., attached to the acquisition device, as part of a companion device accompanying the acquisition device, etc.), and if so continues to block 462 to obtain data that is transmitted from the current acquisition location by that transmitter device and received by one or more receiver devices at the building (whether at fixed locations and/or incorporated in one or more mobile devices), determines or otherwise obtains the current location of one or more such mobile devices at a time of receiving the transmitted data if applicable, determines the position at the building of the acquisition location using information about the building location of those one or more receiver devices and at least distance data determined from the transmitter device data (e.g., using triangulation) and optionally direction data if available, and associates the determined position for the acquisition location with one or more images and/or other groups of data acquired at that acquisition location.

After block 462, or if it is instead determined in block 460 that the data acquisition device is not associated with a transmitter device at the acquisition location, the routine continues instead to block 465, where it determines whether additional location data is available to be used in combination with location-related information based on transmissions from one or more transmitter devices, and if so continues to block 467, where it receives additional location data of one or more types (e.g., GPS data, location data based on visual odometry and/or use of IMU data, etc.), and combines that additional location data with other position data for the acquisition location using transmissions from one or more transmitter devices (e.g., a single transmitter device whose transmitted data is able to provide only distance data) to determine a position at the building at the acquisition location, and associates the determined position for the acquisition location with one or more images and/or other groups of data acquired at that acquisition location.

After block 467, or if it is instead determined in block 465 that additional location data is not available, the routine continues to block 469 to determine if there are more acquisition locations whose positions are to be determined, and if so returns to block 445 to select the next such acquisition location. Otherwise, the routine continues to block 471 to determine whether to generate and provide feedback based on current data acquisition activities, and if so continues to block 473 to generate and present or otherwise provide such feedback (e.g., on the acquisition device and/or associated companion device), such as based at least in part on the determined positions of the one or more acquisition locations and/or data acquired at the acquisition location(s). After block 473, or if it is instead determined in block 471 to not provide feedback, the routine continues to block 419 to determine if there are one or more additional images to acquire, and if so returns to block 415 to obtain one or more such additional images.

Figure 6A:
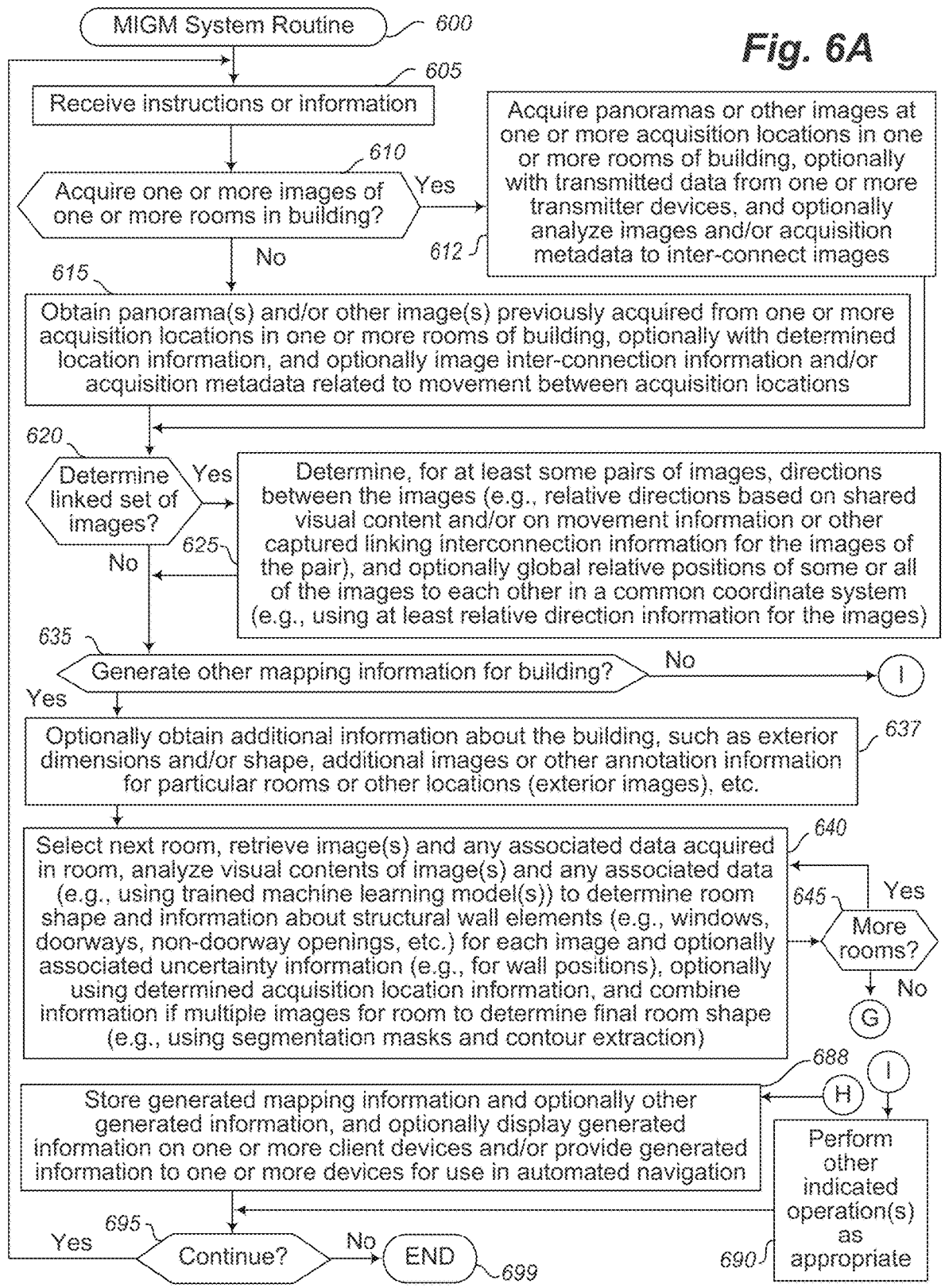
FIGS. 6A-6B illustrate an example embodiment of a flow diagram for a Mapping Information Generation Manager (MIGM) system routine in accordance with an embodiment of the present disclosure.
Figure 6B:
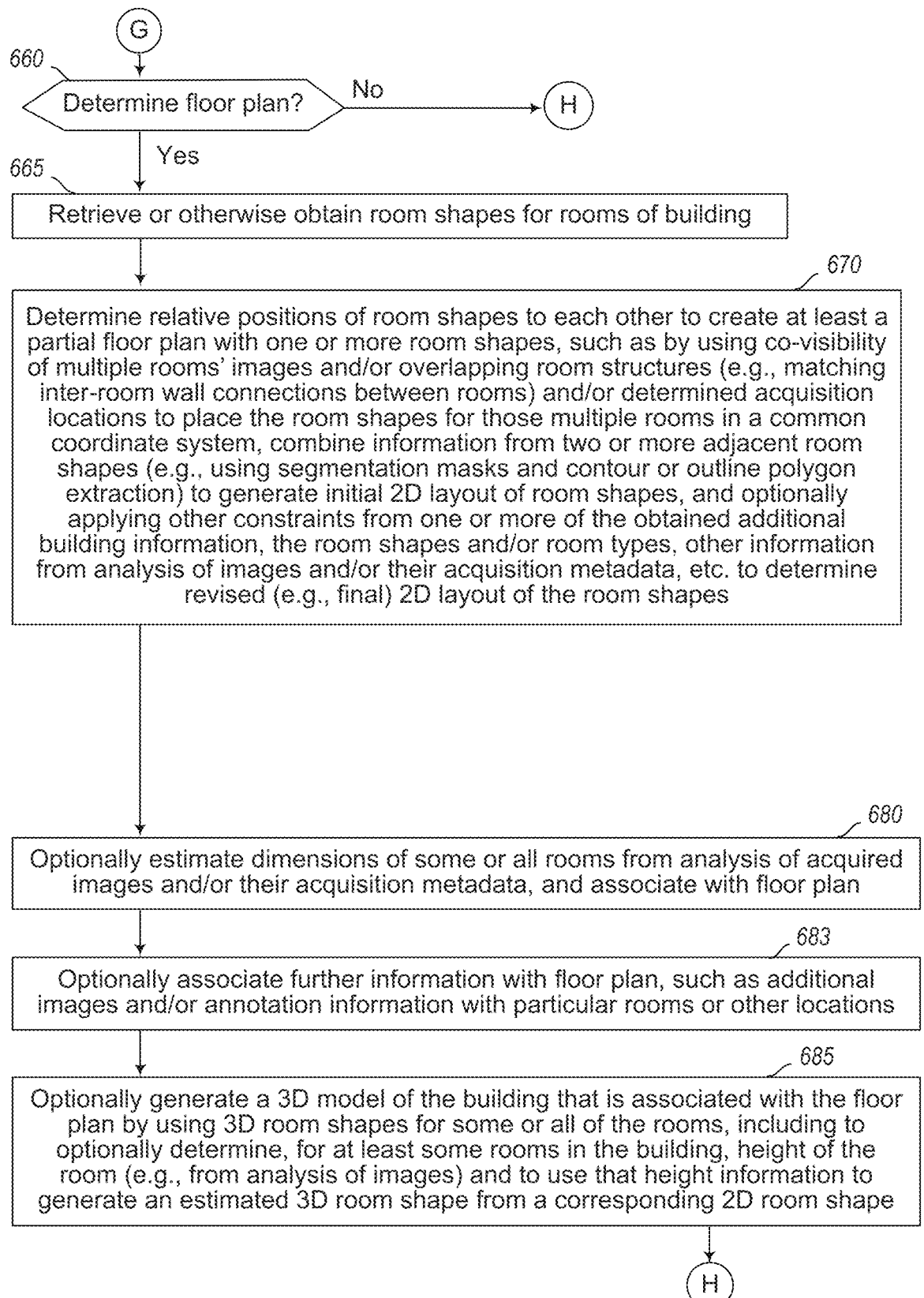

Otherwise, the routine continues to block 420 to perform the MIGM system routine to determine at least partial floor plan information and additional information about the building and its attributes based at least in part on the data acquired by the ICA system routine, and to receive the results from the routine—one example of such an MIGM system routine is discussed further with respect to FIGS. 6A-6B. After block 420, the routine continues to block 425, where it optionally receives additional building information of one or more types (e.g., textual description information, other building attribute data, other images or types of acquired data in or around the building, etc.), optionally uses transmitter device data to determine acquisition location positions of such other acquired data (e.g., in a manner similar to that of blocks 437-469), optionally associates some or all of the additional building information with the floor plan (e.g., based at least in part on determined acquisition location position information for other acquired data), and stores the generated and received building information for further use. After block 425, the routine continues to block 427 to determine whether to generate and provide feedback based on current data acquisition activities (e.g., based at least in part on partial floor plan data generated in block 420), and if so continues to block 428 to generate and present or otherwise provide such feedback (e.g., on the acquisition device and/or associated companion device). After block 428, or if it is instead determined in block 427 to not provide feedback, the routine continues to block 429 to determine whether to acquire additional data for the building, and if so returns to block 415. Otherwise, the routine continues to block 489, where it optionally provides some or all of the determined and/or generated information for the routine to one or more recipients.

If it is determined in block 410 that the instructions or other information received in block 405 are not to generate building information, the routine continues instead to block 490 to perform one or more other indicated operations as appropriate. Such other indicated operations may include, for example, one or more of the following non-exclusive examples: generating a mesh network of transmitter devices and/or receiver devices and optionally determining respective positions of the devices based on the network; receiving and storing (or otherwise determining) information about locations of particular transmitter devices and/or receiver devices in manners other than a mesh network; determining and storing other location data to use in combination with position data determined from transmitter device transmissions, such as from GPS signals, visual odometry and/or IMU data (e.g., SLAM, SfM, etc.), etc.; updating information for moved transmitter devices and/or receiver devices; receiving and storing information about buildings and/or acquisition devices and/or companion devices and/or users for later use; retrieving and providing information from a BALDPM system account for a user device and/or associated user to that device or user; etc.

After blocks 489 or 490, the routine continues to block 495 to determine whether to continue, such as until an explicit indication to terminate is received, or instead only if an explicit indication to continue is received. If it is determined to continue, the routine returns to block 405 to await additional instructions or other information, and otherwise continues to block 499 and ends.

While not illustrated with respect to the automated operations shown in the example embodiment of FIGS. 4A-4B, in some embodiments human users may further assist in facilitating some of the operations of the BALDPM system, such as for operator users and/or end-users of the BALDPM system to provide input of one or more types that is further used in subsequent automated operations. As non-exclusive examples, such human users may provide input of one or more types, such as to provide input related to locations of transmitter and/or receiver devices that are installed or otherwise placed at building locations, to assist with the identification of objects and/or other attributes from analysis of images, floor plans and/or other building information, etc. Additional details are included elsewhere herein regarding embodiments in which human user(s) provide input used in additional automated operations of the BALDPM system.

Figure 5:
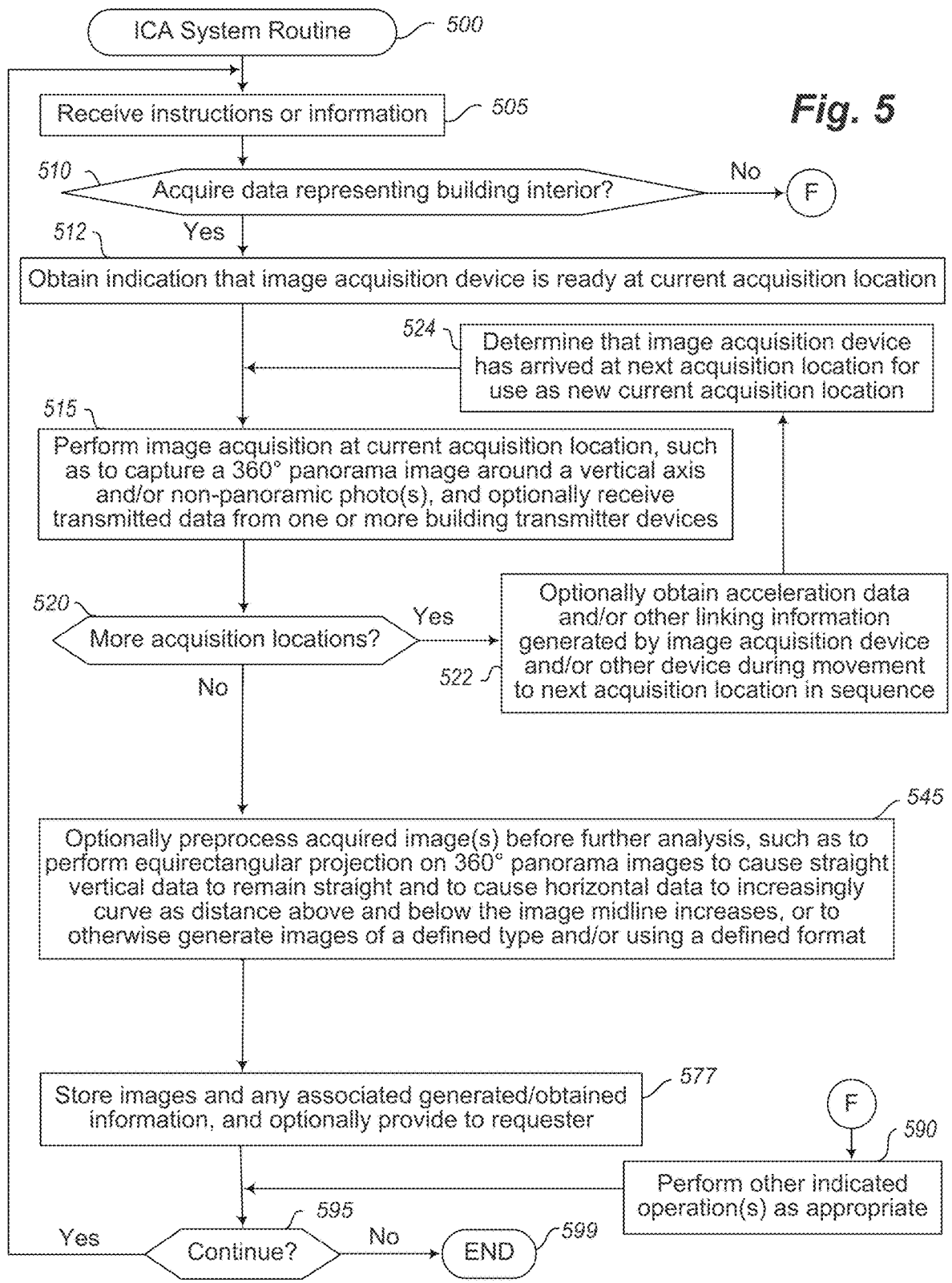
FIG. 5 illustrates an example embodiment of a flow diagram for an Image Capture and Analysis (ICA) system routine in accordance with an embodiment of the present disclosure.

FIG. 5 illustrates an example flow diagram of an embodiment of an ICA (Image Capture & Analysis) system routine 500. The routine may be performed by, for example, the ICA system 150 of FIGS. 1 and 3, and/or an ICA system as described with respect to FIGS. 2A-2D and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest (e.g., on a property on which a target building is located, such as to show yards, decks, patios, accessory structures, etc.). Furthermore, some or all of the routine may be executed on a mobile device used by a user to acquire image information, and/or by a system remote from such a mobile device. In at least some embodiments, the routine 500 may be invoked from block 415 of routine 400 of FIGS. 4A-4B, with corresponding information from routine 500 provided to routine 400 as part of implementation of that block 415, and with processing control returned to routine 400 at block 599 and/or after blocks 577 or 590 in such situations—in other embodiments, the routine 400 may proceed with additional operations in an asynchronous manner without waiting for such processing control to be returned (e.g., to proceed with other processing activities while waiting for the corresponding information from the routine 500 to be provided to routine 400).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired, and to optionally obtain IMU data and/or other acquisition metadata during the image acquisition activities. As one non-exclusive example, the mobile image acquisition device may be a rotating (scanning) panorama camera equipped with a fisheye lens (e.g., with 180° of horizontal coverage) and/or other lens (e.g., with less than 180° of horizontal coverage, such as a regular lens or wide-angle lens or ultrawide lens or macro lens). The routine may also optionally obtain annotation and/or other information from the user regarding the acquisition location and/or the surrounding environment, such as for later use in presentation of information regarding that acquisition location and/or surrounding environment. In addition, the routine receives one or more wireless transmissions from each of one or more nearby wireless transmitter devices, for provision to the BALDPM system—in other embodiments in which the acquisition device has an associated wireless transmitter (e.g., as part of the acquisition device, as temporarily attached to the acquisition device, as part of a mobile companion device proximate to the acquisition device, etc.), that wireless transmitter may be sending wireless transmissions while at the acquisition location to one or more wireless receiver devices in the building (e.g., to perform such wireless transmissions while the data acquisition activities of block 515 are being performed).

After block 515 is completed, the routine continues to block 520 to determine if there are more acquisition locations at which to acquire images, such as based on corresponding information provided by the user of the mobile device and/or received in block 505—in some embodiments, the ICA routine will acquire only a single image and then proceed to block 577 to provide that image and corresponding information (e.g., to return the image and corresponding information to the BALDPM system and/or MIGM system for further use before receiving additional instructions or information to acquire one or more next images at one or more next acquisition locations). If there are more acquisition locations at which to acquire additional images at the current time, the routine continues to block 522 to optionally initiate the acquisition of linking information (e.g., acceleration data) during movement of the mobile device along a travel path away from the current acquisition location and towards a next acquisition location within the building interior. The acquired linking information may include additional sensor data (e.g., from one or more IMU, or inertial measurement units, on the mobile device or otherwise carried by the user) and/or additional visual information (e.g., images, video, etc.) recorded during such movement. Initiating the acquisition of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being acquired, associated lighting/environmental conditions, advisability of acquiring a next acquisition location, and any other suitable aspects of acquiring the linking information. Similarly, the routine may optionally obtain annotation and/or other information from the user regarding the travel path, such as for later use in presentation of information regarding that travel path or a resulting inter-panorama image connection link. In block 524, the routine determines that the mobile device has arrived at the next acquisition location (e.g., based on an indication from the user, based on forward movement of the mobile device stopping for at least a predefined amount of time, etc.), for use as the new current acquisition location, and returns to block 515 to perform the acquisition location image acquisition activities for the new current acquisition location.

If it is instead determined in block 520 that there are not any more acquisition locations at which to acquire image information for the current building or other structure at the current time, the routine proceeds to block 545 to optionally preprocess the acquired 360° panorama images before their subsequent use (e.g., for generating related mapping information, for providing information about structural elements or other objects of rooms or other enclosing areas, etc.), such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline and/or as the distance to the acquisition location decreases). In block 577, the images and any associated generated or obtained information is stored for later use, and optionally provided to one or more recipients (e.g., to block 415 of routine 400 if invoked from that block)—FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who acquires one or more building interiors, an operator user of the ICA system, etc.), to respond to requests for generated and stored information (e.g., to identify one or more panorama images that match one or more specified search criteria, etc.), to obtain and store other information about users of the system, to perform any housekeeping tasks, etc.

Following blocks 577 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to step 599 and ends.

While not illustrated with respect to the automated operations shown in the example embodiment of FIG. 5, in some embodiments human users may further assist in facilitating some of the operations of the ICA system, such as for operator users and/or end-users of the ICA system to provide input of one or more types that is further used in subsequent automated operations. As non-exclusive examples, such human users may provide input of one or more types as follows: to provide input to assist with determination of acquisition locations, such as to provide input in blocks 512 and/or 524 that is used as part of the automated operations for that block; to perform activities in block 515 related to image acquisition (e.g., to participate in the image acquisition, such as to activate the shutter, implement settings on a camera and/or associated sensor or component, rotate a camera as part of acquiring a panorama image, etc.; to set the location and/or orientation of one or more camera devices and/or associated sensors or components; etc.); to provide input in blocks 515 and/or 522 that is used as part of subsequent automated operations, such as labels, annotations or other descriptive information with respect to particular images, surrounding rooms and/or objects in the rooms; etc. Additional details are included elsewhere herein regarding embodiments in which one or more human users provide input that is further used in additional automated operations of the ICA system.

FIGS. 6A-6B illustrate an example embodiment of a flow diagram for a MIGM (Mapping Information Generation Manager) system routine 600. The routine may be performed by, for example, execution of the MIGM system 160 of FIGS. 1 and 3, and/or a MIGM system as described with respect to FIGS. 2A-2D and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data acquired by a mobile computing device and using determined room shapes, and/or to generate other mapping information for a building or other defined area based at least in part on one or more images of the area and optionally additional data acquired by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein. In at least some embodiments, the routine 600 may be invoked from block 420 of routine 400 of FIGS. 4A-4B, with corresponding information from routine 600 provided to routine 400 as part of implementation of that block 420, and with processing control returned to routine 400 at block 699 or after blocks 688 and/or 699 in such situations—in other embodiments, the routine 400 may proceed with additional operations in an asynchronous manner without waiting for such processing control to be returned (e.g., to proceed to block 425 once the corresponding information from routine 600 is provided to routine 400, to proceed with other processing activities while waiting for the corresponding information from the routine 600 to be provided to routine 400, etc.).

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein—implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, and optionally along with determined positions of acquisition locations as determined by the BALDPM system, and such as may in some situations have been supplied in block 605 along with the corresponding instructions.

After blocks 612 or 615, the routine continues to block 620, where it determines whether to generate mapping information that includes an inter-linked set of target panorama images (or other images) for a building or other group of rooms (referred to at times as a 'virtual tour', such as to enable an end-user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and if acquisition location position information is not already determined and provided, determines, for each pair, relative directions between the images of the pair based on shared visual content and/or on other acquired linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images)—if acquisition location position information is already determined and provided, that information may be used to determine the relative direction information between pairs of images, whether instead of or in addition to the visual data analysis. The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end-users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), determined acquisition location position information, etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/objects, such as windows, doorways and stairways and other inter-room wall openings and connecting passages, wall borders between a wall and another wall and/or ceiling and/or floor, etc.) and their positions within the determined room shape of the room—if acquisition location position information is already determined and provided, that information may be used as part of determining the room shape information, whether instead of or in addition to the visual data analysis. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data acquired by an image acquisition device or associated mobile computing device, optionally using one or more of SfM (Structure from Motion) or SLAM (Simultaneous Location And Mapping) or MVS (Multi-View Stereo) analysis). In addition, the activities of block 645 may further optionally determine and use initial pose information for each of those panorama images (e.g., as supplied with acquisition metadata for the panorama image) and/or determined acquisition location position information, and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640 and on determined acquisition location position information if available, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations; using determined acquisition location position information; etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients (e.g., to block 420 of routine 400 if invoked from that block), and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

While not illustrated with respect to the automated operations shown in the example embodiment of FIGS. 6A-6B, in some embodiments human users may further assist in facilitating some of the operations of the MIGM system, such as for operator users and/or end-users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically determined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically determined information about a final room shape, etc.; to provide input with respect to block 670, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regarding embodiments in which human user(s) provide input that is further used in additional automated operations of the MIGM system.

Figure 7:
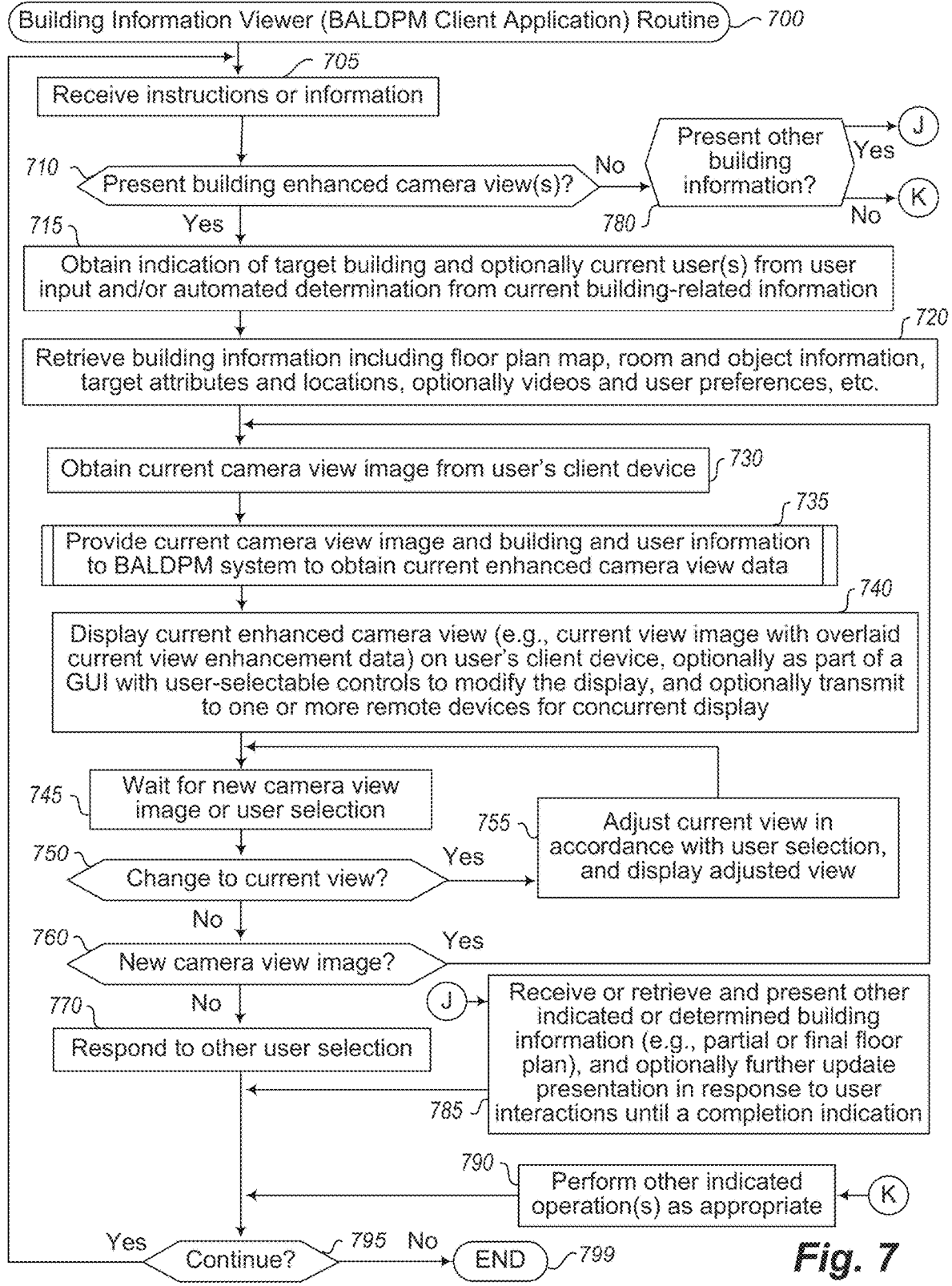
FIG. 7 illustrates an example embodiment of a flow diagram for a Building Information Viewer system routine in accordance with an embodiment of the present disclosure.

FIG. 7 illustrates an example embodiment of a flow diagram for a Building Information Viewer system routine 700, such as may be implemented by an embodiment of the BALDPM client application in some embodiments and situations (e.g., to provide feedback to a user of an acquisition device). The routine may be performed by, for example, execution of a BALDPM client application 154 or other building information viewer system 154 of mobile device 185 of FIG. 3 and/or of such a client application or other building information viewer system otherwise executing on a mobile device 175 and/or other computing system or device as described elsewhere herein, such as to receive and present building information (e.g., individual images; floor plans and/or other mapping-related information, such as determined room structural layouts/shapes, a virtual tour of inter-linked images, etc.; generated building description information; videos; etc.). In the example of FIG. 7, the presented information is for one or more buildings (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information in block 705 are to present enhanced camera view data for a current building, and if not continues to block 780. Otherwise, the routine continues to block 715 to obtain information for the current target building and optionally one or more current users, such as from current user input and/or an automated determination using current building-related information. In block 720, the routine then optionally retrieves building information such as a floor plan, room and object information, attributes and locations, etc. for the current building, such as for use in presentations in association with enhanced camera view data (e.g., in additional panes or portions of a GUI that also shows the enhanced camera view data). In block 730, the routine then obtains one or more current camera view target images from the mobile device, and in block 735 proceeds to provide the current target image(s) and indication of the current building to the BALDPM system to obtain current enhanced camera view data, optionally along with other building and user information. In block 740, the routine then receives and presents the current enhanced camera view data on the mobile device, optionally as part of a GUI that includes user-selectable controls to modify the presentation (whether as part of visual enhancement data overlaid on a current image and/or other separate GUI controls), and optionally with other types of presented building information. In some embodiments, the routine 700 and/or routine 400 further transmits the same enhanced camera view data to one or more other remote devices for concurrent display (e.g., as part of a shared video conference). The routine then proceeds to perform blocks 745-755 to correspond to optional user interactions with the current presented enhanced camera view data and/or other user activities (e.g., movement of the mobile device to cause new target image(s) to be acquired), such as to wait in block 745 for a user selection or an indication of a new target image, and to then determine in block 750 if a user selection or other interaction with the current enhanced camera view has occurred, and if so to proceed to block 755 to adjust the current enhanced camera view in accordance with the user selection and display a corresponding adjusted view, before returning to block 745. If it is instead determined in block 750 that a new camera view target image is received, the routine returns to block 730 to obtain and present new enhanced camera view data based on the new target image, and otherwise continues to block 770 to respond to another user selection (e.g., to suspend or end a current presentation session at the current building; to switch to a presentation of a different type of building information, such as a floor plan and/or other previously acquired images; etc.).

If it is determined in block 710 that the instructions or other information received in block 705 do not indicate to present enhanced camera view data for a current building, the routine continues to block 780 to determine whether the instructions or other information received in block 705 indicate to present one or more other types of information about one or more buildings of interest (e.g., feedback corresponding to current acquisition activities for a building). If so, the routine continues to block 785 to determine the one or more buildings of interest (e.g., based on information supplied in block 705, such as identifications of those buildings and/or by using one or more criteria to identify the buildings) and to retrieve corresponding information for the building(s) (e.g., of a default type, such as a floor plan for a single building, comparison information of one or more types for multiple buildings, etc.; of one or more types indicated in block 705; etc., and optionally by interacting with a MIGM system and/or a BALDPM system to obtain that information), and presents the information on the mobile device. If the presented information includes one or more user-selectable GUI controls or other interaction mechanisms, the routine may further receive and respond to user selections or other interactions with the presentation information as appropriate, including to retrieve and present additional information as selected by the user. Additional details are included elsewhere herein regarding presentation of various types of building information.

If it is instead determined in block 780 that the instructions or other information received in block 705 do not indicate to present one or more other types of information about one or more buildings of interest, the routine continues instead to block 790 to perform one or more other indicated operations as appropriate, such as to configure parameters to be used in various operations of the system (e.g., based at least in part on information specified by a user of the system, such as a user of a mobile device who acquires one or more building interiors, an operator user of the BALDPM and/or MIGM systems, etc., including for use in personalizing information display for a particular recipient user in accordance with his/her preferences or other information specific to that recipient), to obtain and store other information about users of the system (e.g., preferences or other information specific to that user), to respond to requests for generated and stored information, to receive data acquired by the user device and/or other user-supplied information (e.g., notes) and send them to the BALDPM system for storage (e.g., in an ongoing visit log), to perform any housekeeping tasks, etc.

Following blocks 770 or 785 or 790, the routine proceeds to block 795 to determine whether to continue, such as until an explicit indication to terminate is received, or instead only if an explicit indication to continue is received. If it is determined to continue, the routine returns to block 705 to await additional instructions or information, and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    obtaining, by one or more computing devices that include an image acquisition device having a camera and a beacon signal receiver and one or more hardware processors, information about a plurality of wireless beacon transmitter devices in multiple rooms of a house that includes, for each of the wireless beacon transmitter devices, an associated identifier transmitted by that wireless beacon transmitter device and a respective location of that wireless beacon transmitter device in one of the multiple rooms;
    acquiring, by the image acquisition device, multiple images and additional data at multiple acquisition locations in the multiple rooms of the house, the additional data including, for each of the multiple acquisition locations, one or more received wireless transmissions from one or more of the plurality of wireless beacon transmitter devices that include at least the identifier of each of the one or more wireless beacon transmitter devices; and
    determining, by the image acquisition device and for each of the multiple acquisition locations, a position in the house of that acquisition location, including combining, for each of the one or more wireless beacon transmitter devices from which the wireless transmissions are received at that acquisition location, the respective location in the house of that wireless beacon transmitter device with determined information from the one or more wireless transmissions received at that acquisition location about at least one of direction or distance between that acquisition location and that wireless beacon transmitter device;
    generating, by the image acquisition device and based at least in part on the determined positions in the house of the multiple acquisition locations, a floor plan for the house, including determining multiple room shapes that are based on analysis of visual data of the multiple images and that include a respective room shape of each of the multiple rooms with planar surfaces to represent locations of walls and a floor and a ceiling of that room, and positioning the determined multiple room shapes relative to each other on the floor plan;
    generating, by the image acquisition device and based at least in part on the generated floor plan, feedback regarding acquisition of one or more additional images in one or more additional areas of the house, the feedback including information about at least one of quality or completeness for at least one of the multiple images;
    presenting, by the image acquisition device, the generated floor plan and the generated feedback;
    acquiring, by the image acquisition device and after the presenting, the one or more additional images in the one or more additional areas of the house; and
    generating, by the one or more computing devices, a further floor plan for the house based at least in part on adding information for the house to the floor plan from the acquired one or more additional images.

2. The computer-implemented method of claim 1 wherein the plurality of wireless beacon transmitter devices each further includes a beacon signal receiver, and wherein the method further comprises, before the acquiring of the multiple images:
    generating, by the one or more computing devices and based at least in part on transmissions between the wireless beacon transmitter devices, a mesh network that includes the wireless beacon transmitter devices; and
    determining, by the one or more computing devices, the respective locations of the wireless beacon transmitter devices based at least in part on the mesh network.

3. The computer-implemented method of claim 2 wherein the determining of the respective locations of the wireless beacon transmitter devices based at least in part on the mesh network includes at least one of:
    using, by the one or more computing devices, triangulation to determine relative coordinates of the wireless beacon transmitter devices in a common coordinate system based at least in part on determined relative locations of pairs of the wireless beacon transmitter devices in the mesh network; or
    receiving absolute coordinates for at least one of the wireless beacon transmitter devices, and determining, by the one or more computing devices, absolute coordinates for one or more other wireless beacon transmitter devices based at least in part on the determined relative locations of the pairs of the wireless beacon transmitter devices in the mesh network.

4. The computer-implemented method of claim 1 wherein the plurality of wireless beacon transmitter devices each includes a beacon signal receiver, and wherein the method further comprises:
    acquiring, by an additional image acquisition device having an additional camera and an associated additional wireless beacon transmitter device, one or more further images at one or more further acquisition locations at the house;
    determining, by the one or more computing devices and for each of the one or more further acquisition locations, a position at the house of that acquisition location based at least in part on information obtained from one or more of the wireless beacon transmitter devices about one or more additional transmissions received by the one or more wireless beacon transmitter devices from the additional wireless beacon transmitter wireless beacon transmitter device at that acquisition location, and on the respective location in the house of each of those one or more wireless beacon transmitter devices,
    and wherein the generating of the further floor plan for the house is further based in part on adding information for the house to the floor plan from the acquired one or more further images at positions on the further floor plan that are based on the determined position for each of the one or more further acquisition locations.

5. A computer-implemented method comprising:
    associating, by one or more computing devices, a respective location in a building with each of one or more wireless beacon transmitter devices in the building;
    obtaining, by the one or more computing devices, multiple images acquired at multiple acquisition locations in multiple rooms of the building and, for each of the multiple acquisition locations, transmitted data received at that acquisition location from at least one of the one or more wireless beacon transmitter devices;

determining, by the one or more computing devices and for each of the multiple acquisition locations, a position in the building of that acquisition location based at least in part on the respective location in the building for each of the at least one wireless beacon transmitter devices from which the transmitted data is received at that acquisition location;

determining, by the one or more computing devices and based on analysis of visual data of the multiple images, multiple walls of the multiple rooms of the building, and determining multiple room shapes that include a respective room shape of each of the multiple rooms with planar surfaces to represent at least locations of walls of that room;

generating, by the one or more computing devices, a floor plan for the multiple rooms of the building that shows visible representations of the multiple rooms, including positioning the determined room shapes of the multiple rooms relative to each other on the floor plan based at least in part on the determined positions in the building of the multiple acquisition locations; and providing, by the one or more computing devices, the generated floor plan for further use.

6. The computer-implemented method of claim 5 wherein the one or more wireless beacon transmitter devices include multiple wireless beacon transmitter devices at multiple locations in the multiple rooms of the building and each further including a beacon signal receiver, and wherein the method further comprises, before acquiring of the multiple images:

generating, based at least in part on transmissions between the multiple wireless beacon transmitter devices, a mesh network that includes the multiple wireless beacon transmitter devices; and determining the respective location of each of the wireless beacon transmitter devices at the building based at least in part on the mesh network.

7. The computer-implemented method of claim 6 wherein the multiple acquisition locations include at least one acquisition location inside the building and at least one other acquisition location outside the building, and wherein the generated at least-floor plan of the building further includes a representation of at least one area outside the building.

8. The computer-implemented method of claim 5 wherein the one or more computing devices include an image acquisition device having a camera and a beacon signal receiver and one or more hardware processors, and wherein acquisition of the multiple images and the determining of the positions in the buildings of the multiple acquisition locations and the determining of the multiple walls and the determining of the multiple room shapes and the generating and the providing are performed by the image acquisition device.

9. The computer-implemented method of claim 5 wherein the one or more wireless beacon transmitter devices include multiple wireless beacon transmitter devices at multiple locations in the building, and wherein the determining of the position in the building of each of the multiple acquisition locations includes at least one of:

using, by the one or more computing devices, triangulation based at least in part on two or more respective locations for two or more of the multiple wireless beacon transmitter devices from which transmitted data is received at that acquisition location and on at least one of direction or distance that is determined between that acquisition location and each of the two or more wireless beacon transmitter devices to determine the position in the building of that acquisition location; or determining, by the one or more computing devices, direction and distance between that acquisition location and a single wireless beacon transmitter device from which transmitted data is received at that acquisition location, and combining the determined direction and distance with the respective location in the building of the single wireless beacon transmitter device to determine the position in the building of that acquisition location.

10. The computer-implemented method of claim 5 wherein the one or more wireless beacon transmitter devices is each at least one of a Bluetooth Low Energy (BLE) beacon device or an ultra-wideband (UWB) device.

11. The computer-implemented method of claim 5 wherein the determining of the position in the building of one of the multiple acquisition locations further includes combining at least one of direction or distance that is determined between the one acquisition location and each of the at least one wireless beacon transmitter devices from which transmitted data is received at the one acquisition location with additional location data determined for the one acquisition location, the additional location data being based on at least one of one or more GPS signals received by an image acquisition device that acquires one or more of the multiple images at the one acquisition location, or of visual odometry performed by the image acquisition device, or of movement information from one or more accelerometers or gyroscopes on the image acquisition device.

12. The computer-implemented method of claim 5 wherein the multiple images are acquired by an image acquisition device during an image acquisition session at the building and include at least one panorama image with 360 degrees of horizontal visual coverage.

13. The computer-implemented method of claim 12 further comprising temporarily positioning the one or more wireless beacon transmitter devices in the building at a beginning of the image acquisition session and removing the one or more wireless beacon transmitter devices from the building at an end of the image acquisition session.

14. The computer-implemented method of claim 5 wherein the determining of the multiple room shapes is performed without using any depth data acquired from depth sensors at any of the multiple acquisition locations.

15. A system comprising:

one or more hardware processors of one or more computing devices; and one or more memories with stored instructions that, when executed by at least one of the one or more hardware processors, cause at least one of the one or more computing devices to perform automated operations including at least:

obtaining multiple groups of data that are acquired at multiple acquisition locations in multiple areas at a building and, for each of the multiple acquisition locations, transmitted data received at that acquisition location from at least one wireless transmitter device at the building, the multiple groups of data including multiple images acquired at the multiple acquisition locations, and the multiple areas including multiple rooms;

determining, for each of the multiple acquisition locations and based at least in part on the transmitted data received at that acquisition location, a position of the acquisition location at the building relative to a position of the at least one wireless transmitter device from which the transmitted data is received at that acquisition location;

generating, based on the multiple groups of data and the determined positions of the multiple acquisition locations, feedback related to acquisition of the multiple groups of data that includes information about at least one of quality or completeness for at least one of the multiple images, and providing the generated feedback for use in acquisition of one or more additional groups of data at the building;

determining, based on analysis of visual data of the multiple images, multiple walls of the multiple rooms, and determining multiple room shapes that include a respective room shape of each of the multiple rooms with planar surfaces to represent at least locations of walls of that room;

generating a floor plan for the multiple rooms that shows visible representations of the multiple rooms, including positioning the determined room shapes of the multiple rooms relative to each other on the floor plan based at least in part on determined positions at the building of the multiple acquisition locations; and providing the generated floor plan for further use.

16. The system of claim 15 wherein the generated feedback further includes the floor plan with added visual indications of the determined positions of the multiple acquisition locations, wherein the multiple acquisition locations include at least one acquisition location inside the building and at least one other acquisition location outside the building, and wherein the at least one wireless transmitter device includes multiple wireless beacon transmitter devices at the building and each having a known location at the building.

17. The system of claim 15 wherein the at least one wireless transmitter device includes multiple wireless transmitter devices each having a wireless signal transmitter and a wireless signal receiver, and wherein the automated operations further include, before acquiring of the multiple groups of data:

generating, based at least in part on transmissions between the multiple wireless transmitter devices, a mesh network that includes the multiple wireless transmitter devices; and determining respective positions of the multiple wireless transmitter devices at the building based at least in part on the mesh network, wherein the position of the at least one wireless transmitter device for each of the multiple acquisition locations is the determined respective position of that wireless transmitter device.

18. The system of claim 15 wherein the multiple groups of data further include at least one of one or more videos, or one or more audio recordings, and wherein the at least one wireless transmitter device includes at least one of a Bluetooth Low Energy (BLE) beacon device or an ultra-wideband (UWB) beacon device or a Wi-Fi device.

19. The system of claim 15 wherein the one or more computing devices include an image acquisition device having a camera and a beacon signal receiver and one or more hardware processors, and wherein acquisition of the multiple groups of data and the determining of the position of each of the multiple acquisition locations and the generating of the feedback and the determining of the multiple walls and the determining of the multiple room shapes and the generating of the floor plan are performed by the image acquisition device.

20. The system of claim 15 wherein the groups of data are acquired by a data acquisition device having an associated wireless signal receiver, wherein the one or more computing devices include a mobile computing device that includes the at least one wireless transmitter device and capabilities for determining a position at the building of the mobile computing device and of the at least one wireless transmitter device, and wherein the determining of the position of each of the multiple acquisition locations and the generating of the feedback and the determining of the multiple walls and the determining of the multiple room shapes and the generating of the floor plan are performed by the mobile computing device.

21. A non-transitory computer-readable medium having stored contents that cause one or more computing devices to perform automated operations, the automated operations including at least:

obtaining, by the one or more computing devices, multiple images acquired at multiple acquisition locations in multiple areas at a building by an image acquisition device having an associated wireless beacon transmitter device and, for each of the multiple acquisition locations, information about at least one beacon signal receiver device at a respective different location at the building that receives a wireless transmission from that acquisition location by the associated wireless beacon transmitter device, wherein the multiple areas include multiple rooms;

determining, by the one or more computing devices and for each of the multiple acquisition locations, a position at the building of that acquisition location based at least in part on the respective different location at the building for each of the at least one beacon signal receiver devices that receives the transmitted data from that acquisition location and on determined information from the wireless transmission received from that acquisition location about at least one of direction or distance between that acquisition location and that beacon signal receiver device;

determining, by the one or more computing devices and based on analysis of visual data of the multiple images, multiple walls of the multiple rooms, and determining multiple room shapes that include a respective room shape of each of the multiple rooms with planar surfaces to represent at least locations of walls of that room;

generating, by the one or more computing devices, mapping information for the multiple areas based on analysis of visual data of the multiple images and on the determined positions at the building of the multiple acquisition locations, including generating a floor plan showing visible representations of the multiple rooms by positioning the determined room shapes relative to each other on the floor plan based at least in part on determined positions in the building of the multiple acquisition locations; and providing, by the one or more computing devices, the generated mapping information for the multiple areas for further use.

22. The non-transitory computer-readable medium of claim 21 wherein the stored contents include software instructions that, when executed, cause the one or more computing devices to perform further automated operations including:

obtaining, by the one or more computing devices, one or more additional groups of data that are acquired at one or more additional acquisition locations at the building by an additional data acquisition device having a beacon signal receiver and, for each of the one or more additional acquisition locations, transmitted data received at that additional acquisition location from at least one additional wireless beacon transmitter device at the building; and determining, for each of the one or more additional acquisition locations and based at least in part on the transmitted data received at that additional acquisition location, a position of that additional acquisition location at the building relative to a position of the at least one additional wireless transmitter device from which the transmitted data is received at that acquisition location, and wherein the generating of the mapping information for the multiple areas includes generating mapping information for the building that is further based in part on the one or more additional groups of data and on the determined positions at the building of the one or more additional acquisition locations.

23. The non-transitory computer-readable medium of claim 21 wherein the mapping information for the multiple areas includes a linked group of the multiple images having directional information between at least some pairs of the multiple images.

24. The non-transitory computer-readable medium of claim 21 wherein the building includes a plurality of beacon signal receiver devices at a plurality of positions at the building, wherein the automated operations further include determining, by the one or more computing devices, a respective location at a building of each of the beacon signal receiver devices based at least in part on a mesh network of the plurality of beacon signal receiver devices, and wherein the respective different location at the building at the building for each of the at least one beacon signal receiver devices that receives a wireless transmission from one of the multiple acquisition locations is the determined respective location of that that beacon signal receiver device.

25. The non-transitory computer-readable medium of claim 21 wherein, for at least one of the images acquired at one of the acquisition locations, the at least one beacon signal receiver device that receives a wireless transmission from that one acquisition location is part of a mobile computing device, and wherein the automated operations further includes determining, by the mobile computing device, the respective different location at the building of the mobile computing device at a time of receiving the wireless transmission from that one acquisition location using capabilities of the mobile computing device.

26. The non-transitory computer-readable medium of claim 21 wherein the multiple acquisition locations include at least one acquisition location inside the building and at least one other acquisition location outside the building, and wherein the at least one beacon signal receiver device includes multiple beacon signal receiver devices at the building and each having a known location at the building.

27. The non-transitory computer-readable medium of claim 21 wherein the image acquisition device further includes one or more processors, and wherein the one or more computing devices are the image acquisition device.

* * * * *

UNITED STATES PATENT AND TRADEMARK OFFICE
CERTIFICATE OF CORRECTION

| | | |
|---|---|---|
| PATENT NO. | : 12,462,483 B2 | Page 1 of 1 |
| APPLICATION NO. | : 18/093780 | |
| DATED | : November 4, 2025 | |
| INVENTOR(S) | : Sean P. Cier et al. | |

It is certified that error appears in the above-identified patent and that said Letters Patent is hereby corrected as shown below:

In the Claims

<u>Column 47, Line 46, Claim 7:</u>
"generated at least-floor plan of the building further includes" should read --generated floor plan of the building further includes--.

Signed and Sealed this
Second Day of December, 2025

John A. Squires
*Director of the United States Patent and Trademark Office*